(12) United States Patent
McCanless et al.

(10) Patent No.: US 10,327,312 B2
(45) Date of Patent: *Jun. 18, 2019

(54) LED LUMINAIRE ASSEMBLIES WITH BLUETOOTH CAPABILITY

(71) Applicant: ABL IP Holding LLC, Decatur, GA (US)

(72) Inventors: Forrest Starnes McCanless, Oxford, GA (US); Stephen Haight Lydecker, Snellville, GA (US); Albert Tran, Lawrenceville, GA (US); Stephen Barry McCane, McDonough, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,128

(22) Filed: Sep. 14, 2017

(65) Prior Publication Data

US 2018/0077781 A1    Mar. 15, 2018

Related U.S. Application Data

(60) Provisional application No. 62/403,349, filed on Oct. 3, 2016, provisional application No. 62/394,471, filed on Sep. 14, 2016.

(51) Int. Cl.
*H05B 37/00* (2006.01)
*H05B 37/02* (2006.01)
(Continued)

(52) U.S. Cl.
CPC ......... *H05B 37/0272* (2013.01); *F21K 9/278* (2016.08); *F21S 4/20* (2016.01);
(Continued)

(58) Field of Classification Search
CPC ............ H05B 37/0272; H05B 37/0227; H05B 33/0872; H05B 37/0281; H05B 33/0854;
(Continued)

(56) References Cited

U.S. PATENT DOCUMENTS 7,521,872 B2   4/2009   Bruning
7,741,782 B2   6/2010   Vermeulen et al.
(Continued)

FOREIGN PATENT DOCUMENTS

CN   204442783 U   7/2015
TW   201309059 A   2/2013
(Continued)

OTHER PUBLICATIONS

Anonymous, "Pacific sun debuts diuna T5HO light fixture", retrieved from: http://aquanerd.com/2013/08/pacific-sun-diuna-t5ho-light-fixture.html, AquaNerd, Aug. 20, 2013, 11 pages.
(Continued)

*Primary Examiner* — Monica C King
(74) *Attorney, Agent, or Firm* — Kilpatrick Townsend & Stockton LLP

(57) ABSTRACT

A Bluetooth beacon for a luminaire assembly includes a module and an antenna associated with the module. The Bluetooth beacon is monted such that the antenna is communicatively visible from a light emitting side of the luminaire assembly. The Bluetooth beacon is configured to provide a signal extending a predetermined distance from the luminaire assembly such that a Bluetooth receiver on a user device can receive a signal from the Bluetooth beacon.

9 Claims, 25 Drawing Sheets

(51) Int. Cl.
*F21S 4/20* (2016.01)
*F21V 15/01* (2006.01)
*H01Q 1/22* (2006.01)
*F21K 9/278* (2016.01)
*G01S 1/08* (2006.01)
*H01Q 1/32* (2006.01)
*H01Q 1/44* (2006.01)
*H01Q 23/00* (2006.01)
*F21Y 103/10* (2016.01)
*F21Y 115/10* (2016.01)
*G01S 1/04* (2006.01)
*F21V 33/00* (2006.01)

(52) U.S. Cl.
CPC ............... *F21V 15/01* (2013.01); *G01S 1/08* (2013.01); *H01Q 1/2291* (2013.01); *H01Q 1/3283* (2013.01); *H01Q 1/44* (2013.01); *H01Q 23/00* (2013.01); *F21V 33/0052* (2013.01); *F21Y 2103/10* (2016.08); *F21Y 2115/10* (2016.08); *G01S 1/042* (2013.01)

(58) Field of Classification Search
CPC   H05B 37/0218; H05B 33/0803; H05B 37/02; H05B 39/086; H05B 39/088; H05B 33/08; H05B 33/0857; H05B 37/0236; H05B 37/0245
See application file for complete search history.

(56) References Cited

U.S. PATENT DOCUMENTS

| | | |
|---|---|---|
| 8,226,279 B2 | 7/2012 | Harnischmacher et al. |
| 8,445,826 B2 | 5/2013 | Verfuerth |
| 8,476,565 B2 | 7/2013 | Verfuerth |
| 8,586,902 B2 | 11/2013 | Verfuerth |
| 8,641,241 B2 | 2/2014 | Farmer |
| 8,829,821 B2 | 9/2014 | Chobot et al. |
| 8,863,694 B2 | 10/2014 | Bourget et al. |
| 8,912,735 B2 | 12/2014 | Chobot et al. |
| 8,921,751 B2 | 12/2014 | Verfuerth |
| 8,981,646 B2 | 3/2015 | Kim |
| 9,155,165 B2 | 10/2015 | Chobot |
| 9,155,166 B2 | 10/2015 | Chobot |
| 9,157,618 B2 | 10/2015 | Holland et al. |
| 9,217,555 B2 | 12/2015 | Farmer |
| 9,433,061 B2 | 8/2016 | Chobot |
| 2010/0171430 A1 | 7/2010 | Seydoux |
| 2014/0300293 A1 | 10/2014 | Ruan et al. |
| 2015/0198324 A1 | 7/2015 | O'Brien et al. |
| 2015/0276192 A1* | 10/2015 | Kafry .................... F21V 23/003 362/362 |
| 2015/0289349 A1 | 10/2015 | Kim |
| 2015/0334790 A1 | 11/2015 | Scapa et al. |
| 2015/0354223 A1 | 12/2015 | Biron et al. |
| 2016/0123564 A1 | 5/2016 | Quilici et al. |
| 2018/0074151 A1 | 3/2018 | McCanless et al. |

FOREIGN PATENT DOCUMENTS

| | | |
|---|---|---|
| WO | 2010116269 A1 | 10/2010 |
| WO | 2016066564 A1 | 5/2016 |

OTHER PUBLICATIONS

U.S. Appl. No. 15/705,023, "Non-Final Office Action," dated Jun. 15, 2018, 5 pages.
Canada Application No. CA2,979,364 received an Office Action dated Jan. 2, 2019, 3 pages.

* cited by examiner

LED LUMINAIRE ASSEMBLIES WITH BLUETOOTH CAPABILITY

REFERENCE TO RELATED APPLICATIONS

This application claims the benefit of U.S. Provisional Application No. 62/394,471, filed on Sep. 14, 2016 and entitled LED LUMINAIRE ASSEMBLIES WITH BLUETOOTH CAPABILITY ("the '471 application"), and U.S. Provisional Application No. 62/403,349, filed on Oct. 3, 2016 and entitled LED LUMINAIRE ASSEMBLIES WITH BLUETOOTH CAPABILITY ("the '349 application"). The '471 and '349 applications are hereby incorporated in their entireties by this reference.

FIELD OF THE INVENTION

Embodiments of the invention relate to light emitting diode (LED) luminaire assemblies provided with Bluetooth beacons that include Bluetooth modules with associated Bluetooth antennas.

BACKGROUND

In some cases, it may be advantageous to establish exact, real-time location information in an indoor environment. As one example, retailers may wish to establish real-time location information with a customer within their store. Based on the customer's location, the retailer may communicate with the customer and assist with locating particular items, promote specific products, or provide various other types of communication. Location information can normally be obtained through GPS. However, in the indoor environment, GPS may not work or is insufficiently accurate. Therefore, there is still a need for a system that can provide real-time location information in an indoor environment.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a Bluetooth beacon for a luminaire assembly includes a module and an antenna associated with the module. In some examples, the antenna is communicatively visible from the light emitting side of the luminaire assembly. In various aspects, the Bluetooth beacon is configured to provide a signal extending a predetermined distance from the luminaire assembly such that a Bluetooth receiver on a user device can receive a signal from the Bluetooth beacon.

In some examples, a luminaire assembly includes a housing, a light source, and the Bluetooth beacon. In various other examples, a retrofit kit for an existing luminaire assembly includes the Bluetooth beacon and a beacon support that is configured to connect to the existing luminaire assembly.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
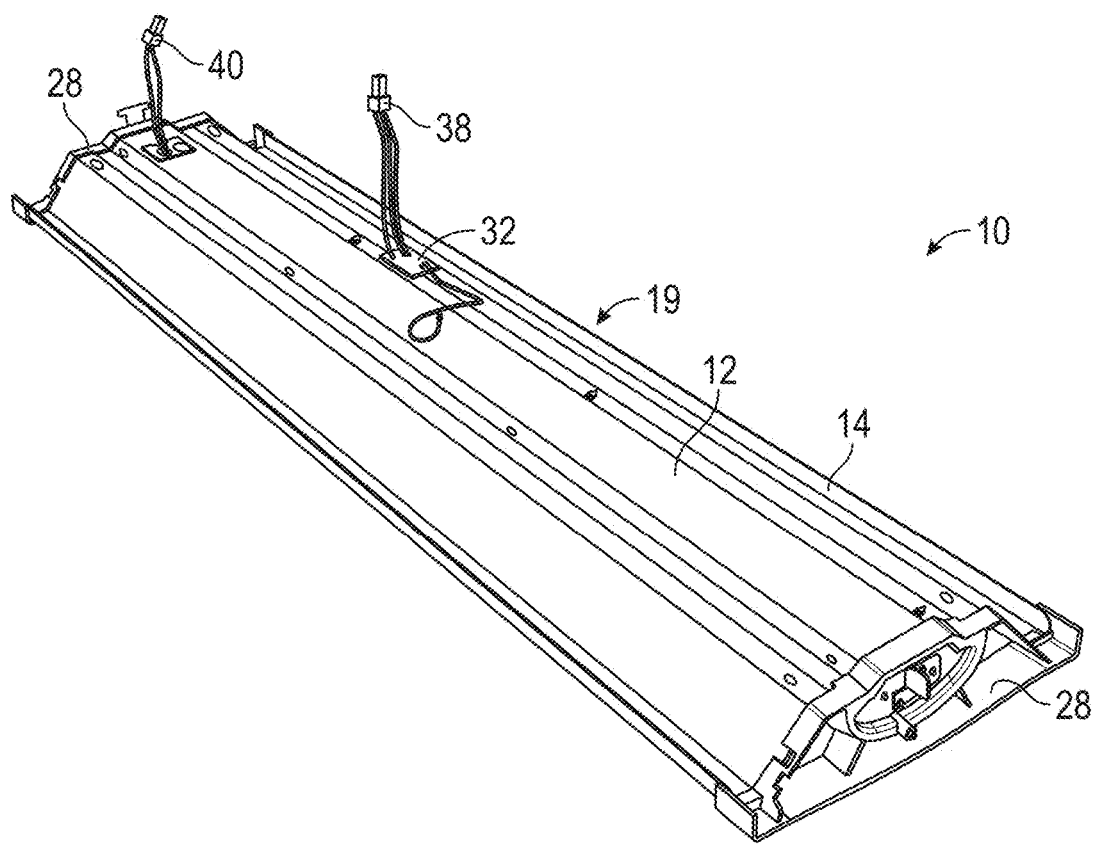
FIG. 1 is a top perspective view of a luminaire assembly according to aspects of the present disclosure.

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Examples of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some cases, it may be advantageous to establish exact, real-time location information in an indoor environment where GPS may not work or is insufficiently accurate. In such cases, luminaires installed within the environment may be equipped to provide real-time location information to various user devices, such as smartphones, cell phones, tablets, and various other user devices.

One manner by which to do this is with visual light communication (VLC) technology. Generally, light sources such as LEDs can be modulated (brightened and dimmed) at a high enough rate or frequency to be invisible to the human eye but detectible by a camera on a smart mobile device, such as a smartphone or tablet. The modulation appears to the camera as a pattern of light and dark lines (essentially a bar code) across the illuminated area of the modulating light source. A different modulation pattern may be used in each installed light fixture so as to create a unique bar code for each fixture, which ultimately can be manipulated into a unique identifier for each fixture. The light fixtures can then be used by a mobile device as a positioning system that can, for example, direct the user to the desired area within a store in which the fixtures are installed.

However, VLC technology requires a direct line-of-sight between the light fixture and the camera of the user device. Sometimes, an insufficient number or quality of unique modulating light sources may be visible to the user device. In such circumstances, a Bluetooth beacon—which includes at least one Bluetooth module and at least one associated Bluetooth antenna—may be provided in the LED luminaire to provide location information. The Bluetooth beacon installed in each luminaire can provide radio-frequency (RF) triangulation to the smartphone or tablet's Bluetooth receiver/transmitter. This approach is referred to as Bluetooth Low Energy (BLE) positioning. The BLE antenna is capable of providing an adequate signal strength at some distance from the LED luminaire such that a Bluetooth receiver on the user device can receive a signal from several BLE antennas on luminaires at once. Unlike VLC technology, BLE beacons do not require a direct line-of-sight with the user device to be able to communicate with the user device. The BLE beacons may be used in conjunction with VLC technology or in place of VLC technology.

Embodiments of the present invention are directed to various ways to incorporate and integrate BLE beacons into luminaires, either by retrofitting them into existing fixtures or providing them on new (i.e., native) fixtures. Embodiments of the present invention are directed to various ways by which to incorporate Bluetooth beacons within LED luminaires, and embodiments of the present invention are not intended to be limited to the particulars of the LED luminaires themselves.

Most luminaires include a housing and a light engine provided in the housing to generate light. Generally, the area above the light engine is the non-light emitting side of the fixture (because light is not directed toward that region of the luminaire) whereas the area below the light engine is the light emitting side of the fixture from which light is emitted from the luminaire. Embodiments contemplated herein position the components of the BLE beacon at various locations within a luminaire.

Luminaire Assembly

FIGS. 1-4 illustrate embodiments of a light engine (referred to herein as the LED luminaire assembly 10) for positioning within a luminaire housing (not shown). One embodiment of the fixture shown in FIGS. 1-4 is described in more detail in U.S. patent application Ser. No. 15/014,518, filed on Feb. 3, 2016 and titled "Easy Install Light Engine Retrofit Kit and Method for Using Same," which is hereby incorporated by reference in its entirety.

The LED luminaire assembly 10 includes a reflector 12 having an upper surface 14 and an lower surface 16. Light sources (such as LEDs 22 or other suitable light sources) are provided on the lower surface 16 of the reflector 12 so as to emit light from a light emitting side 18 of the luminaire assembly 10. In some embodiments, the LEDs 22 are mounted on a channel cover 26 that is, in turn, mounted on the reflector 12. The LEDs 22 are shown provided on printed circuit boards 20 ("PCB"). In this example, the LED luminaire 10 includes two PCBs 20 having LEDs 22. However, in other embodiments no PCB 20 is needed; rather, the LEDs 22 are chip-on-board LEDs 22 provided directly on the reflector 12 or channel cover 26. In further examples, any number of PCBs 20 may be provided, such as one PCB 20 or more than two PCBs 20. The LEDs 22 may be various types of LEDs 22 including single-die LEDs, multi-die LEDs, DC LEDs, AC LEDs, organic light emitting diodes, and/or various other suitable LEDs. White, color, or multi-color LEDs 22 may be used. Moreover, the LEDs 22 need not all be the same color and/or type; rather, mixtures of different colors and/or types of LEDs 22 may be used.

Figure 5:
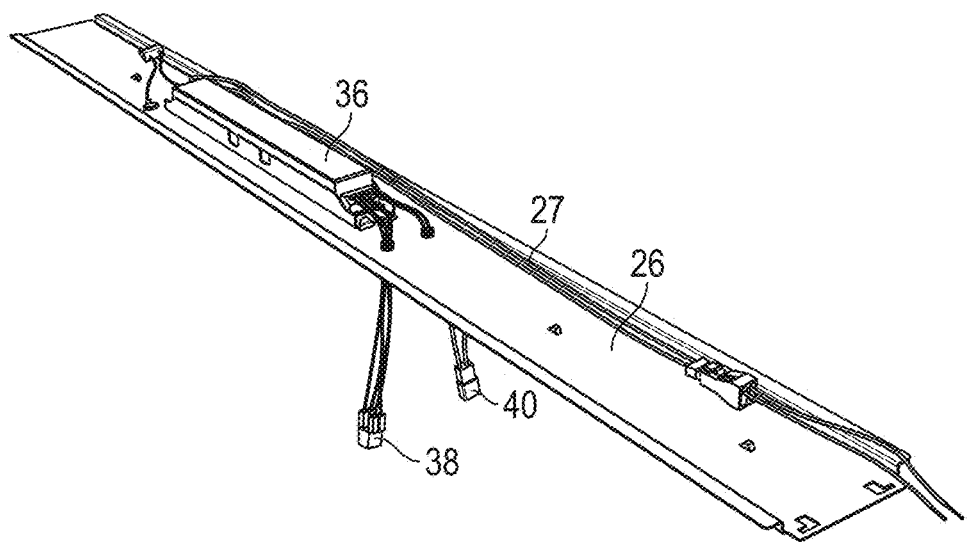
FIG. 5 is a top perspective view of a channel cover according to aspects of the present disclosure.

The LED luminaire assembly 10 of FIGS. 1-4 further includes an optic 24 (such as a lens, diffuser, or other suitable optic) provided over the LEDs 22 and positioned on the luminaire assembly 10. In various examples, the optic 24 may be positioned through various mechanisms such as via snap-fitting onto the channel cover 26 or through various other suitable connection mechanisms to the channel cover 26 or other components of the luminaire assembly 10. The optic 24 can be made of any non-metallic material that permits light to exit through the optic 24, including, but not limited to, polymeric materials, silicone and various other suitable materials for light distribution. End caps 28 are positioned at the ends of the reflector 12. A driver for driving the LEDs 22 could be provided in various locations on the LED luminaire assembly 10, such as on the upper surface 14 of the reflector 12, on the channel cover 26, or various other suitable locations. For example, FIG. 5 illustrates an example of a channel cover 26 where a driver 36 for driving the LEDs 22 is mounted on the upper surface 27 of the channel cover 26.

In use, the LED luminaire assembly 10 is supported within a housing so as to create a non-light emitting side 19 above the LED luminaire assembly 10 and the light emitting side 18 below the LED luminaire assembly 10 (i.e., the side where light is emitted from the luminaire assembly 10). It will be appreciated that the shape, configuration, and components of the LED luminaire assembly 10 should not be considered limiting on the present disclosure as the LED luminaire assembly 10 may have any desired shape or configuration with fewer or additional components.

Bluetooth Beacon

The BLE beacons disclosed herein include a BLE module 32 as well as a BLE antenna 34. In various examples, the BLE module 32 and BLE antenna 34 may be provided as a component of a retrofit kit for a non-LED luminaire 10, may be provided as a retrofit kit for a LED luminaire, and/or may be provided on new (i.e., native) fixtures.

In use, only the BLE antenna 34 (not the BLE module 32) need be "communicatively visible" to the room, meaning that it must be capable of providing adequate signal strength at some distance from the LED luminaire 10 such that a BLE receiver on the user device 118 (see FIG. 13) can receive a signal from the BLE antenna 34. It is preferable, though not required, that the BLE module 32 be provided in a location on the fixture so as not to be visible from a vantage point below the fixture. In certain examples, the BLE antenna 34 may be communicatively visible to the room while visually hidden from view. In other examples, the BLE antenna 34 or the BLE module 32 may be exposed to the floor. In various other examples, both the BLE module 32 and BLE antenna 34 are exposed to the floor.

The BLE module 32 and BLE antenna 34 may be provided at various locations on the luminaire 10. In some examples, the BLE module 32 and the BLE antenna 34 are on opposing sides of the luminaire assembly 10. For example, in some cases, one of the BLE module 32 or the BLE antenna 34 is on the non-light emitting side 19 of the luminaire 10, and the other is on the light emitting side 18 of the luminaire 10 (see FIGS. 1-13). In one non-limiting example, the BLE module 32 is positioned on the non-light emitting side 19 and the BLE antenna 34 is positioned on the light emitting side 18. In these examples, the BLE antenna 34 may be mounted on various components on the light emitting side 18 including, but not limited to, the lower surface 16 of the reflector 12, an inner surface of the end cap(s) 28, the lower surface 29 of the channel cover 26, on the PCB(s) 20, and various other locations or components. In some of these examples, the BLE module 32 or BLE antenna 34 on the light emitting side 18 may be under the optic 24, although they need not be.

In other examples, the BLE module 32 and the BLE antenna 34 may be on the same side of the luminaire assembly 10. For example, in some embodiments, both the BLE module 32 and the BLE antenna 34 are on the light emitting side 18 of the luminaire 10 (see FIGS. 14-31). In other embodiments, the BLE module 32 and BLE antenna 34 are both positioned on the non-light emitting side 19 of the LED luminaire assembly 10, such as on the upper surface 14 of the reflector 12, on an outer surface of the end cap(s) 28, and various other similar locations.

It will be appreciated that in embodiments where the BLE module 32 and BLE antenna 34 are separate from each other, connective wiring (typically coaxial cable) will be used to electrically connect the components. Moreover, in such cases where the BLE module 32 is positioned on the non-light emitting side 18 and the BLE antenna 34 is positioned on the light emitting side 18 (or vice versa), through holes to accommodate the connective wiring between the BLE module 32 and BLE antenna 34 may be provided in various components of the LED luminaire 10 (such as through the reflector 12, channel cover 26, etc.). In another example, both the BLE module 32 and the BLE antenna 34 are both positioned on the light emitting side 18 at various locations as described previously. The BLE module 32 and BLE antenna 34 may be integrated on the same component (e.g., the BLE antenna 34 is onboard the BLE module 32) at the same location within the light emitting side 18 or they may be separate components provided at different locations on the light emitting side 18.

The BLE beacon may be powered by the LED driver or may include its own power source. In cases where the BLE beacon is connected to the LED driver, the BLE beacon and driver 36 may optionally have detachable connectors 38. In these cases, the BLE beacon and driver 36 may be selectively connected and disconnected, such as during servicing or replacement of various components of the LED luminaire assembly 10. Similar connectors 40 may also optionally be provided between the driver 36 and the LEDs 22. In other examples, the BLE beacon and/or LEDs 22 may be hard-wired to the driver 36.

The BLE module 32 includes controlling electronics for the BLE beacon. In some cases, the BLE module 32 may be connected to the BLE antenna 34 through wiring or cabling such that the BLE module 32 and BLE antenna 34 may be positioned at different locations on the LED luminaire assembly 10 as desired. In other examples, the BLE antenna 34 may be an onboard antenna on the BLE module 32 in that the BLE antenna 34 is mounted on the BLE module 32. The BLE beacons (as well as components for VLC communication) may be self-contained modules or may be components of installation kits for installing an LED light engine into a new or existing fixture housing.

BLE Module and BLE Beacon on Opposing Sides of Luminaire Assembly

Figure 2:
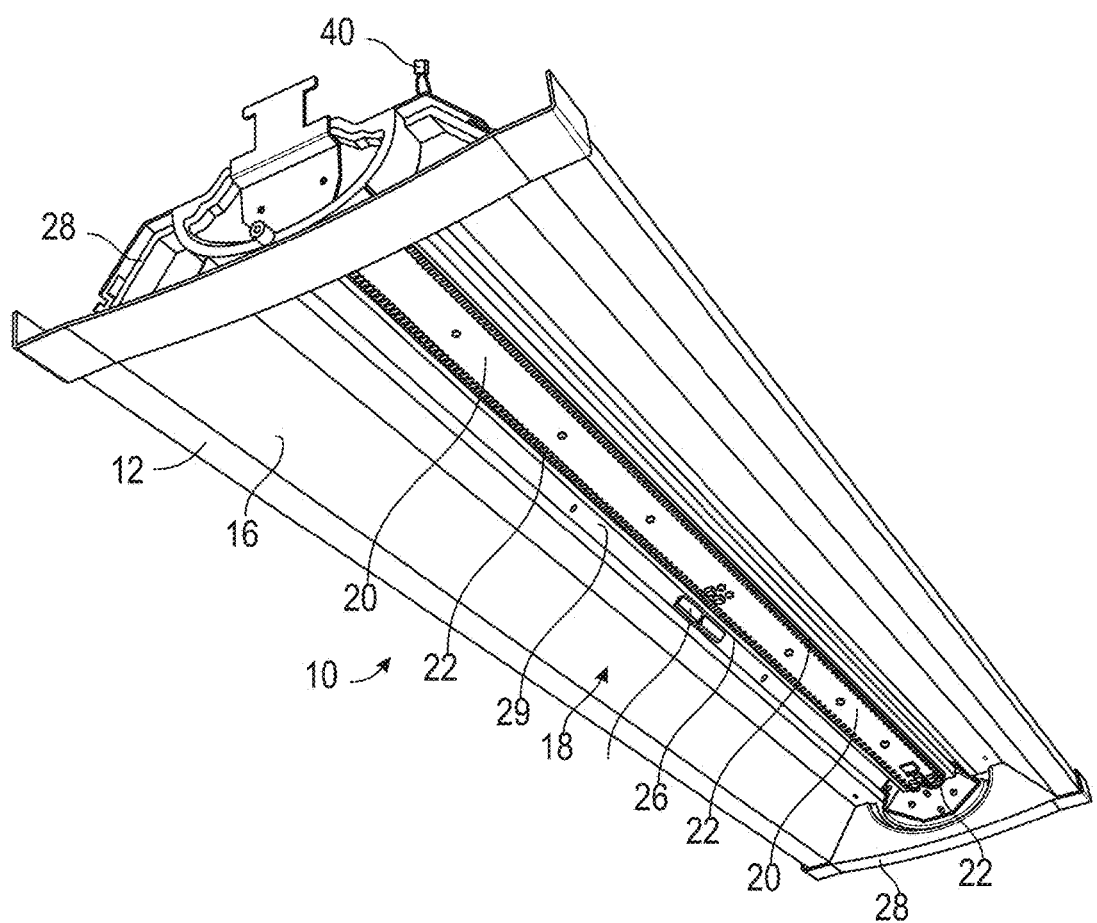
FIG. 2 is a bottom perspective view of the luminaire assembly of FIG. 1.
Figure 3:
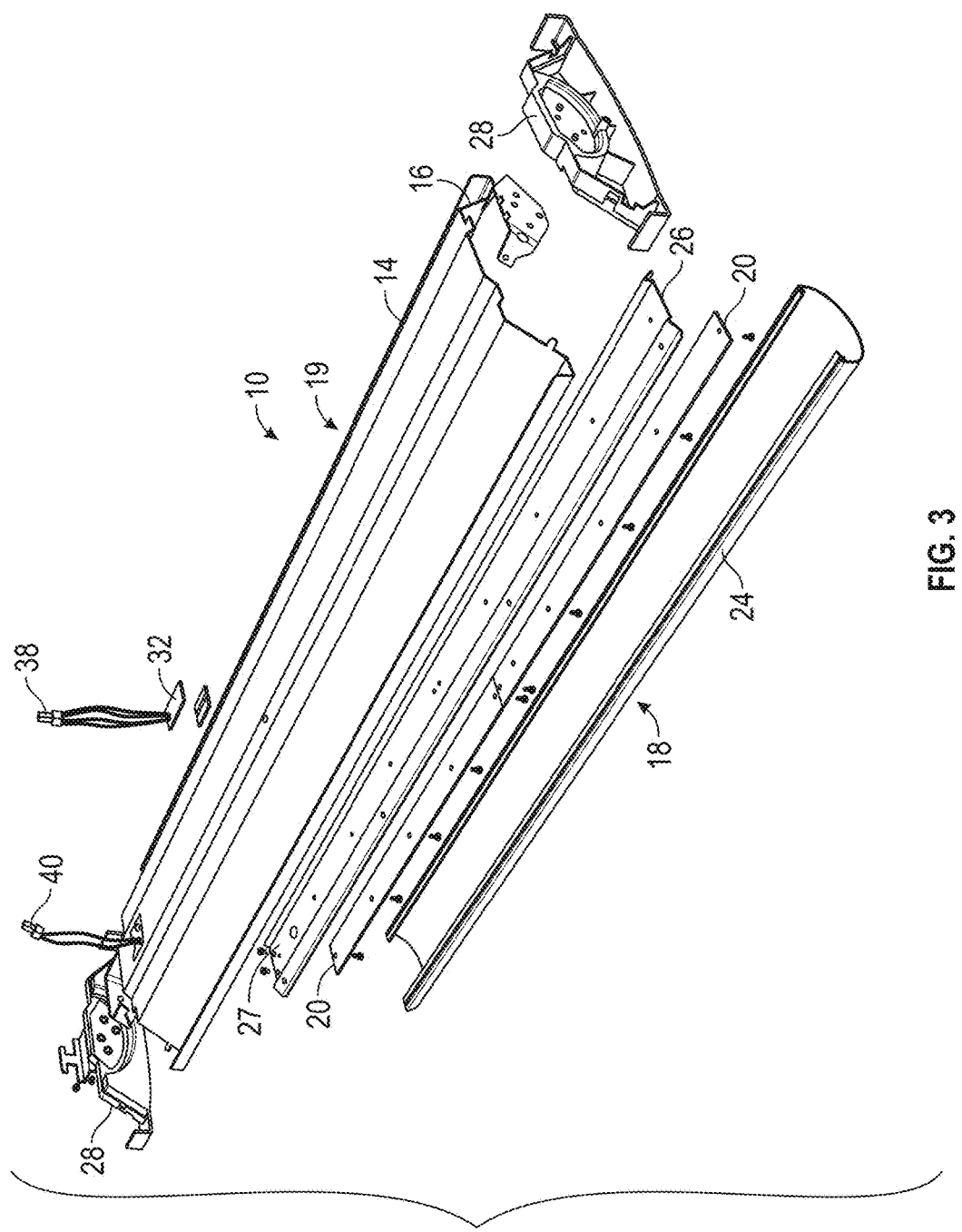
FIG. 3 is an exploded assembly view of the luminaire assembly of FIG. 1.
Figure 4:
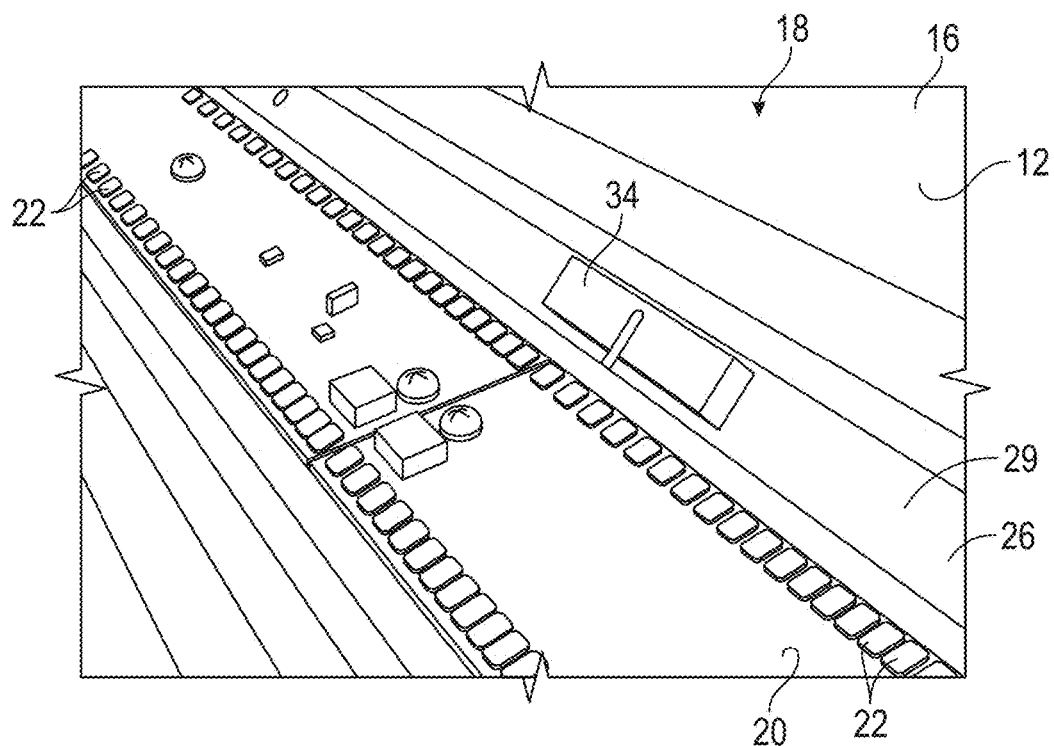
FIG. 4 is an enlarged perspective view of a portion of the luminaire assembly of FIG. 1.

FIGS. 1-5 (discussed above) illustrate embodiments of an LED luminaire assembly 10 provided with a BLE beacon whereby the BLE module 32 and the BLE antenna 34 are provided on opposing sides of the luminaire assembly 10. In this example, the BLE module 32 is mounted on the upper surface 14 of the reflector 12 (i.e., on the non-light emitting side 19 of the LED luminaire assembly 10), and the BLE antenna 34 is positioned on the light emitting side 18 (specifically, it is mounted on the lower surface 29 of the channel cover 26 but could be attached to other structure, including the PCB 20 or reflector 12). The BLE module 32 could be mounted on other components of the LED luminaire assembly 10, such as on the upper surface 27 of the channel cover 26. In FIG. 2, the BLE antenna 34 is shown centrally located on the light emitting side 18 of the LED luminaire 10. In other embodiments, it may be desirable to position the BLE antenna 34 (and the BLE module 32 if positioned on the light emitting side 18) on or adjacent an end of the LED luminaire assembly 10 where minimal light is emitted. Such positioning can be seen, for example, in FIG. 17.

Figure 6:
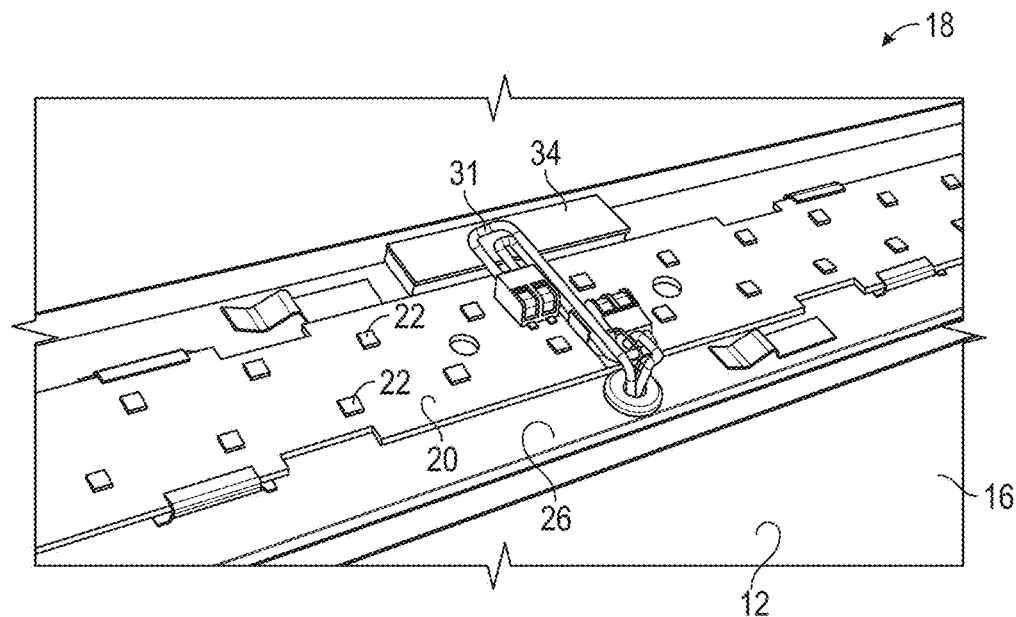
FIG. 6 is an enlarged perspective view of a portion of a luminaire assembly according to aspects of the present disclosure.
Figure 7:
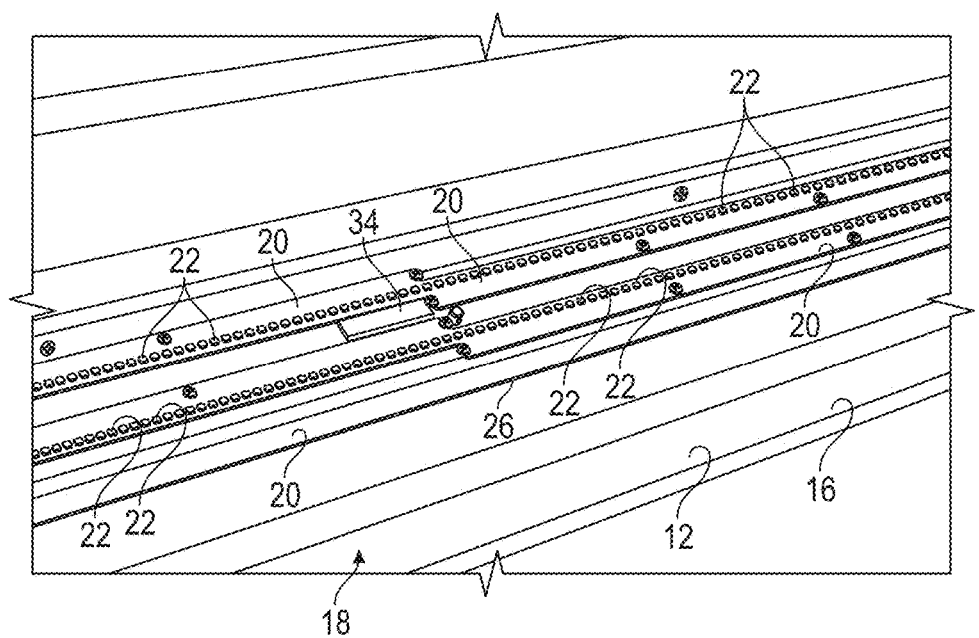
FIG. 7 is an enlarged perspective view of a portion of a luminaire assembly according to aspects of the present disclosure.
Figure 8:
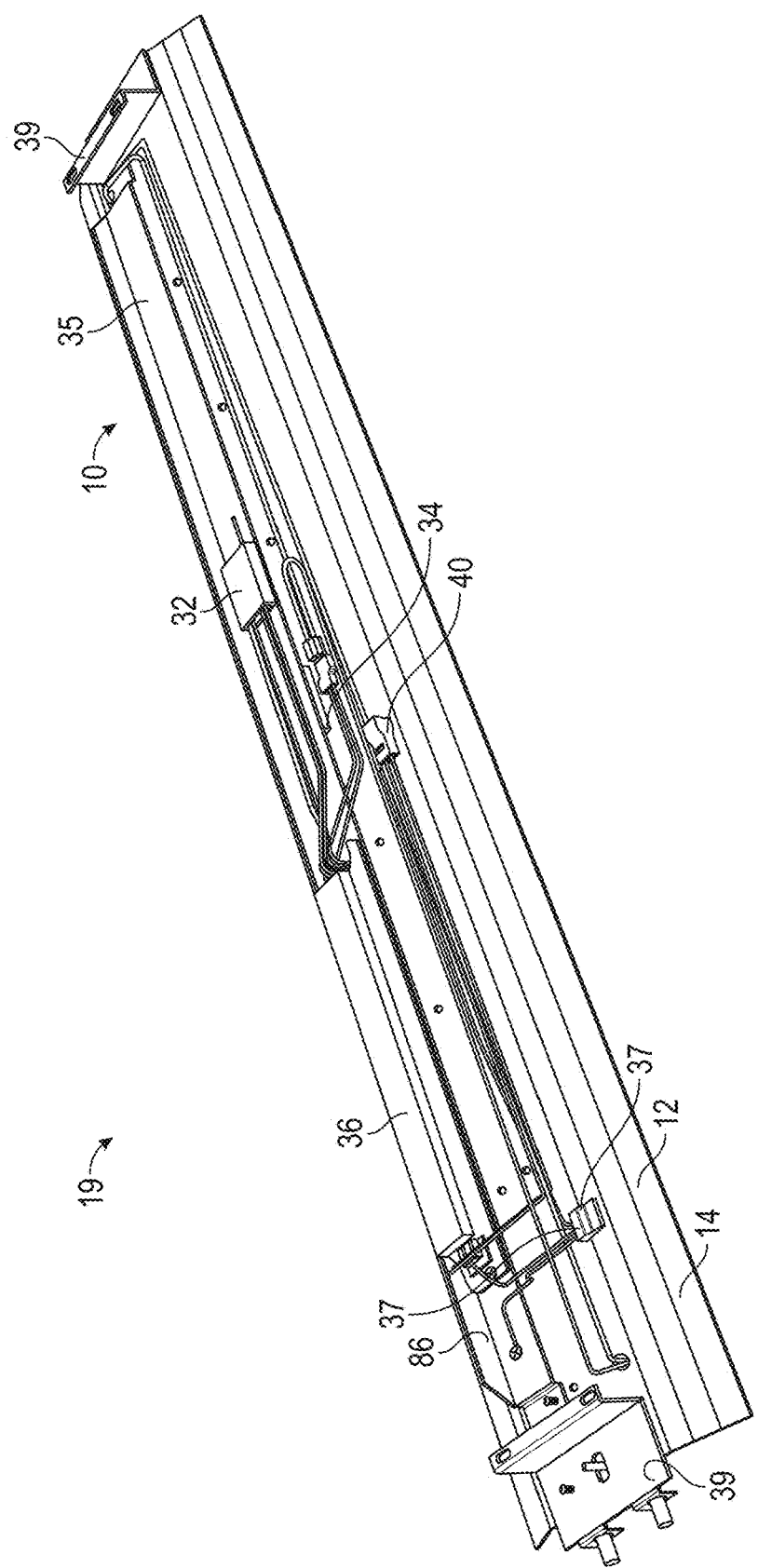
FIG. 8 is a top perspective view of a luminaire assembly according to aspects of the present disclosure.
Figure 9:
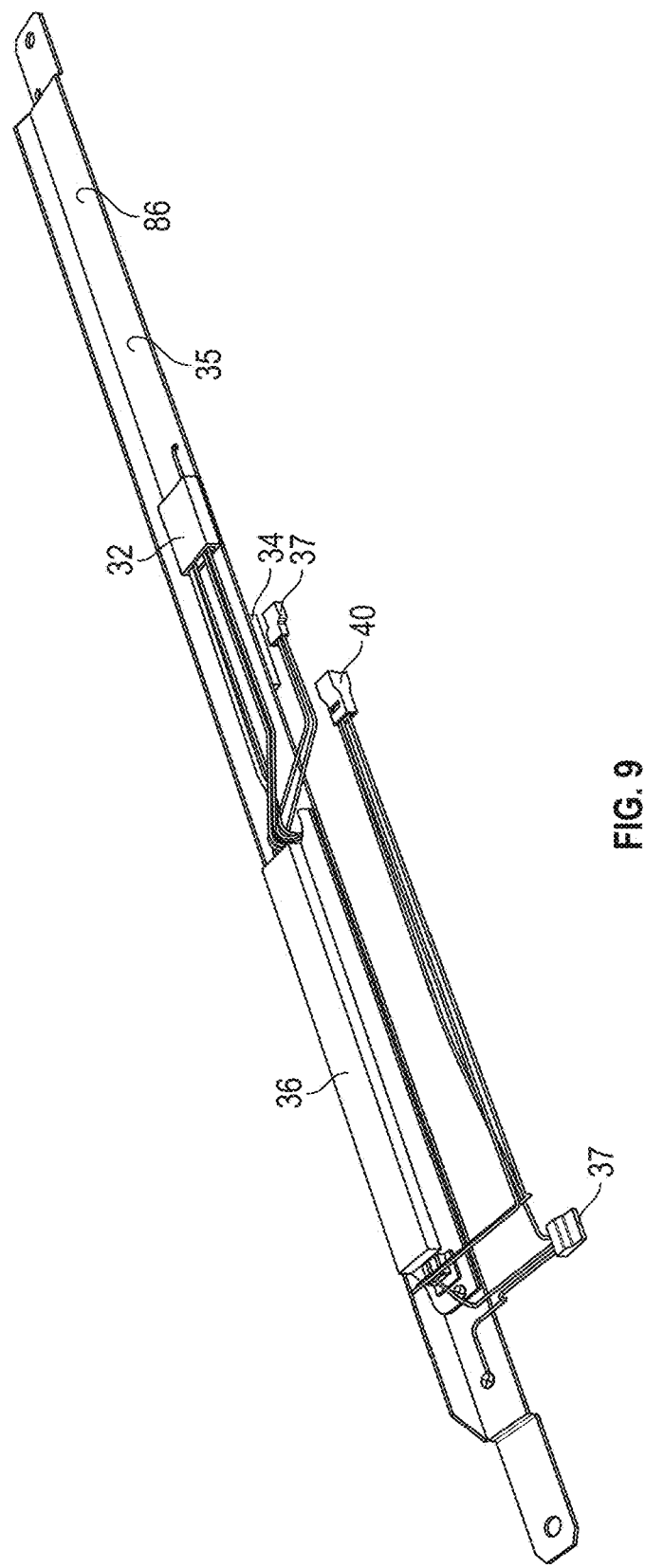
FIG. 9 is a top perspective view of a channel cover of the luminaire assembly of FIG. 8.
Figure 10:
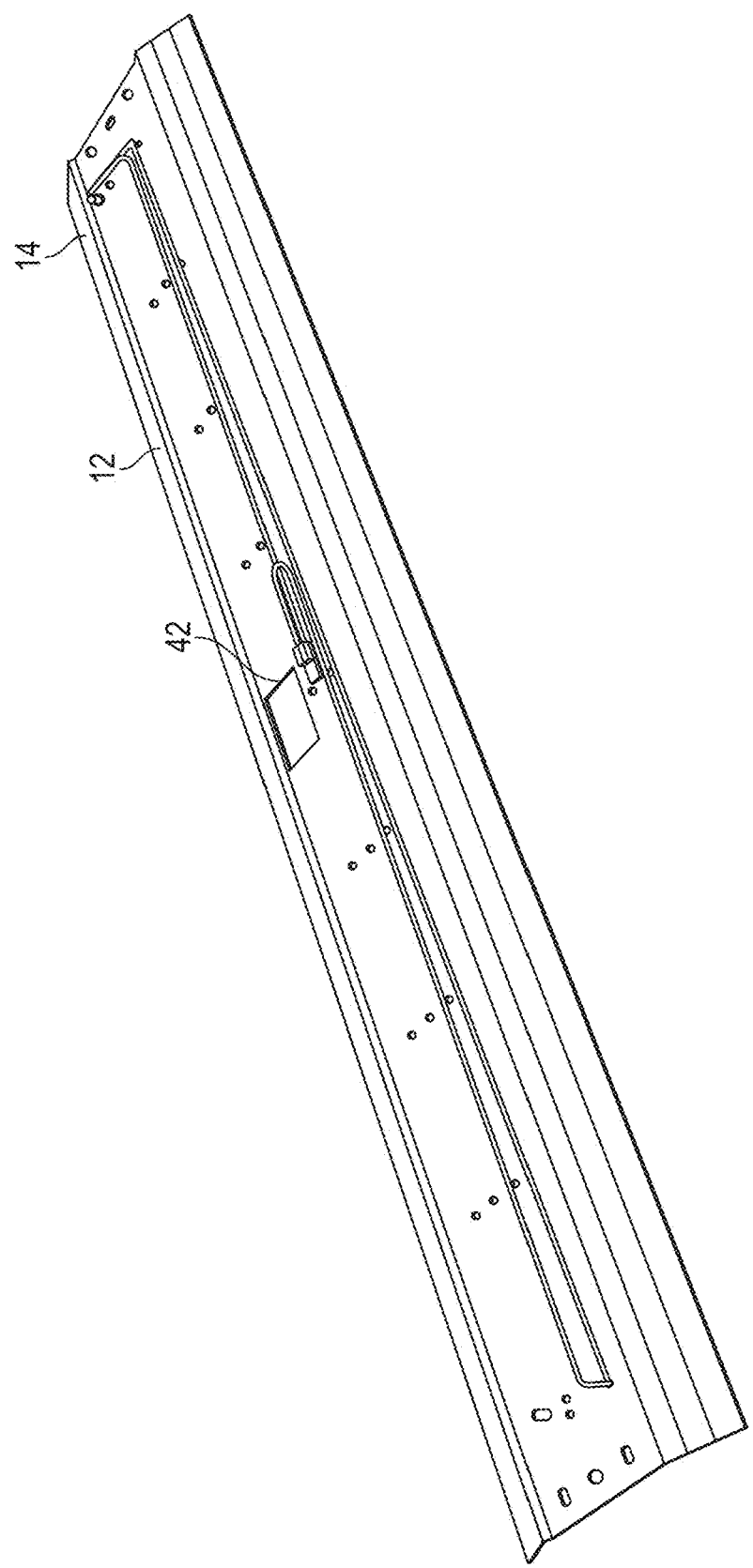
FIG. 10 is a top perspective view of a reflector of the luminaire assembly of FIG. 8.
Figure 11:
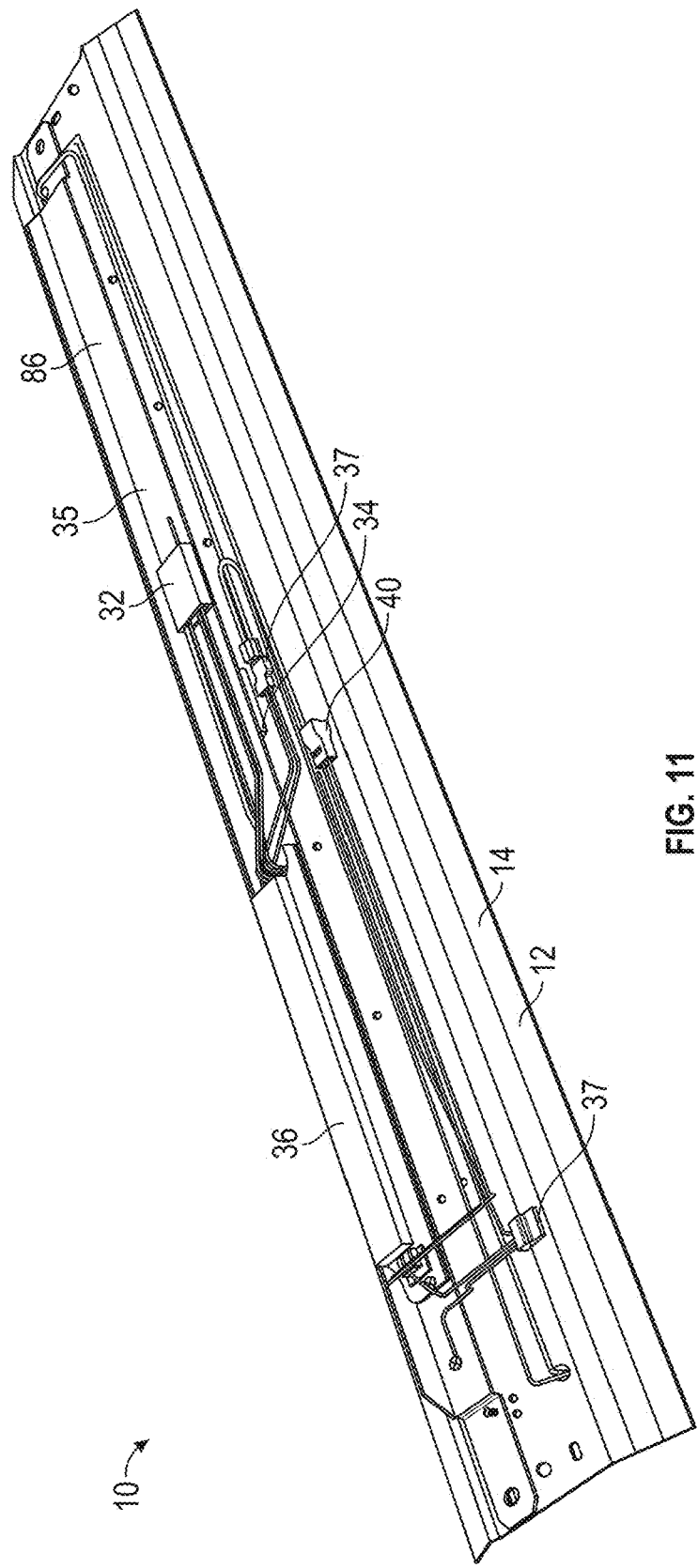
FIG. 11 is a top perspective view of the channel cover of FIG. 9 mounted on the reflector of FIG. 10.

FIGS. 6 and 7 illustrate other embodiments where the BLE module 32 and the BLE antenna 34 are provided on opposing sides of the luminaire assembly 10. In this example, the BLE antenna 34 is mounted on the channel cover 26 adjacent to the PCB 20. The BLE antenna 34 could also be mounted on the PCB 20 or on the reflector 12. The BLE module (not shown) is mounted on the upper surface of the reflector 12.

In the embodiment of FIGS. 1-7, an antenna cable 31 is routed from the BLE module 32 to the BLE antenna 34 via a through hole in the reflector 12 and/or channel cover 26 as necessary. In all of the disclosed embodiments, it is contemplated that a separate, designated wireway could be provided for routing the antenna cable 31 from the BLE antenna 34 to the BLE module 32 or the antenna cable 31 could be positioned in the same wireway as the cables connecting the LEDs 22 to the driver 36. A detachable connector 38 can be provided for electrically connecting the BLE module 32 with the driver 36 (which could be mounted on the upper surface 27 of the channel cover 26 or on the upper surface 14 of the reflector 12).

FIGS. 8-11 illustrate another embodiment where the BLE module 32 and the BLE antenna 34 are provided on opposing sides of the luminaire assembly 10. In this example, the BLE beacon is a component of a power module that can be provided on a retrofit kit. The power module (see FIG. 8) includes a bracket 86 onto which a driver 36 and BLE beacon are mounted. The bracket 86 can be of any suitable size and dimension (depending on the existing luminaire into which it will be installed) and can be of any suitable material (e.g., plastic, metallic, etc.) having suitable structural integrity to support the components. In this embodiment, the driver 36 and BLE module 32 are provided on the upper surface 35 of the bracket 86 and the BLE antenna 34 is provided on the lower surface of the bracket 86 and connected to the BLE module 32 via a wire that extends through the bracket 86. It is also possible that both the BLE module 32 and BLE antenna 34 be provided on the lower surface of the bracket 86. The BLE module 32 is electrically connected to the driver 36. Various other wire connections for connecting the driver 36 to the LEDs (not shown) and incoming power are also provided.

The power module is mounted on the back of the reflector 12 (shown in isolation in FIG. 10) of LED luminaire assembly 10 and more specifically on the upper surface 14 of the reflector 12. (See FIG. 11). In one embodiment, the power module is attached to the reflector 12 via fasteners but other means of connection (both mechanical and chemical) are contemplated. LEDs (not shown) are positioned and extend along the lower surface 16 of the reflector 12. Wires from the PCBs are connected with wires extending from the driver 36 via connectors 37.

A clearance hole 42 is provided in the reflector 12, and the power module is positioned on the reflector 12 such that the BLE antenna 34 is aligned with the clearance hole 42 and in some embodiments protrudes downwardly through the hole 42. In this way, the required "visibility" of the BLE antenna 34 to devices receiving signals from the antenna is achieved. The LED luminaire assembly 10 of FIGS. 8 and 11 can be provided in an existing fixture housing in myriad ways, including via use of mounting brackets 39.

Figure 12:
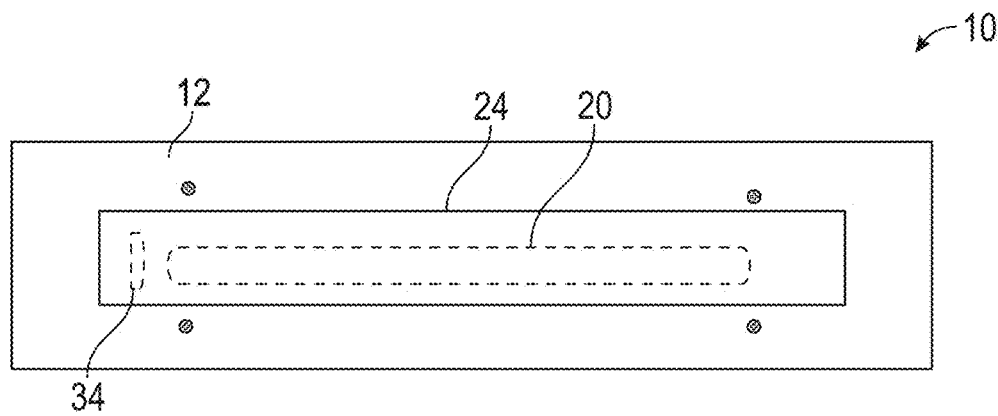
FIG. 12 is a schematic bottom view of a luminaire assembly according to aspects of the present disclosure.
Figure 13:
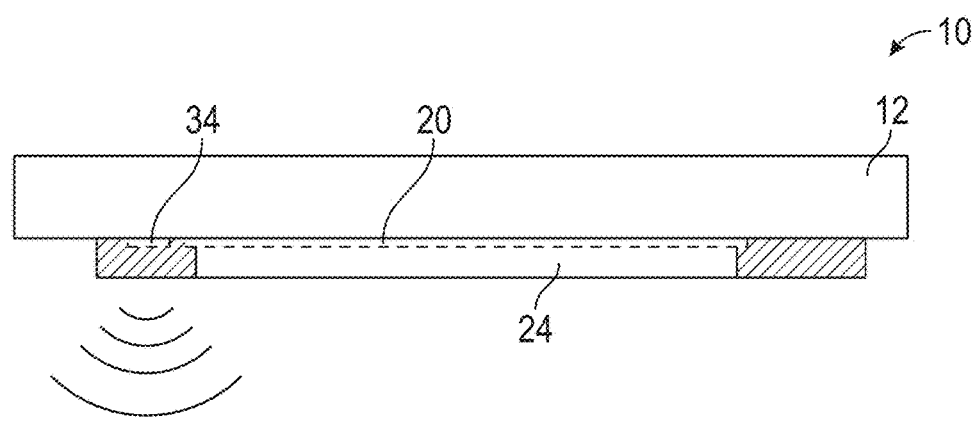
FIG. 13 is a schematic side view of the luminaire assembly of FIG. 12.
Figure 13:
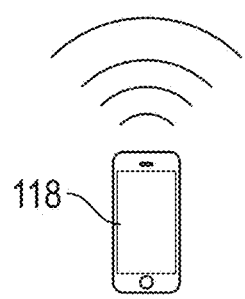
Figure 14:
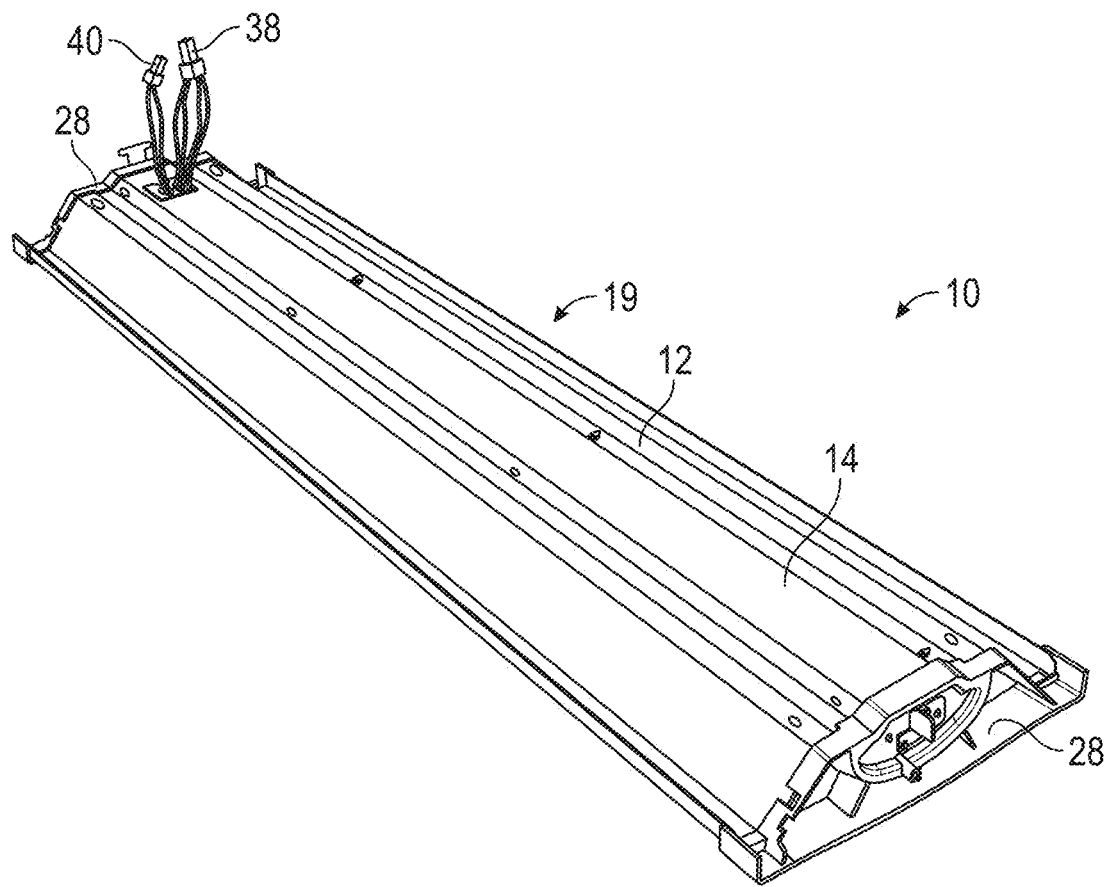
FIG. 14 is a top perspective view of a luminaire assembly according to aspects of the present disclosure.
Figure 15:
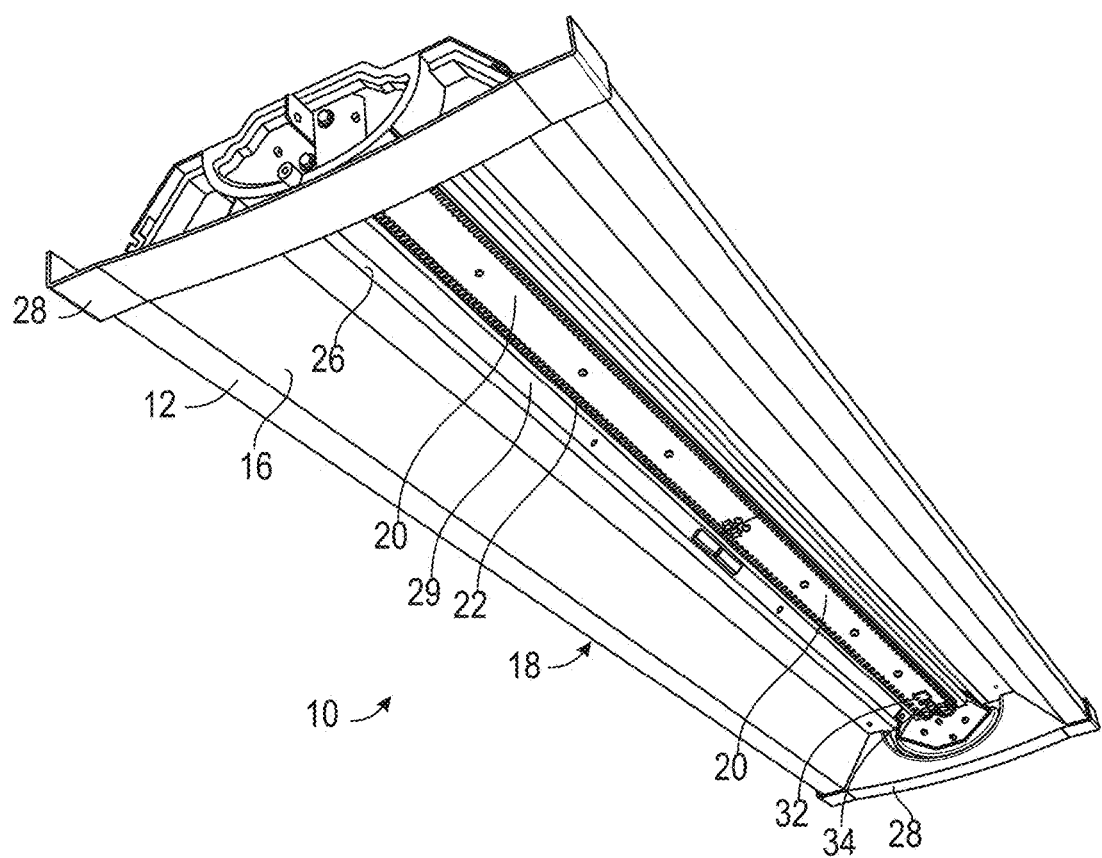
FIG. 15 is a bottom perspective view of the luminaire assembly of FIG. 14.
Figure 16:
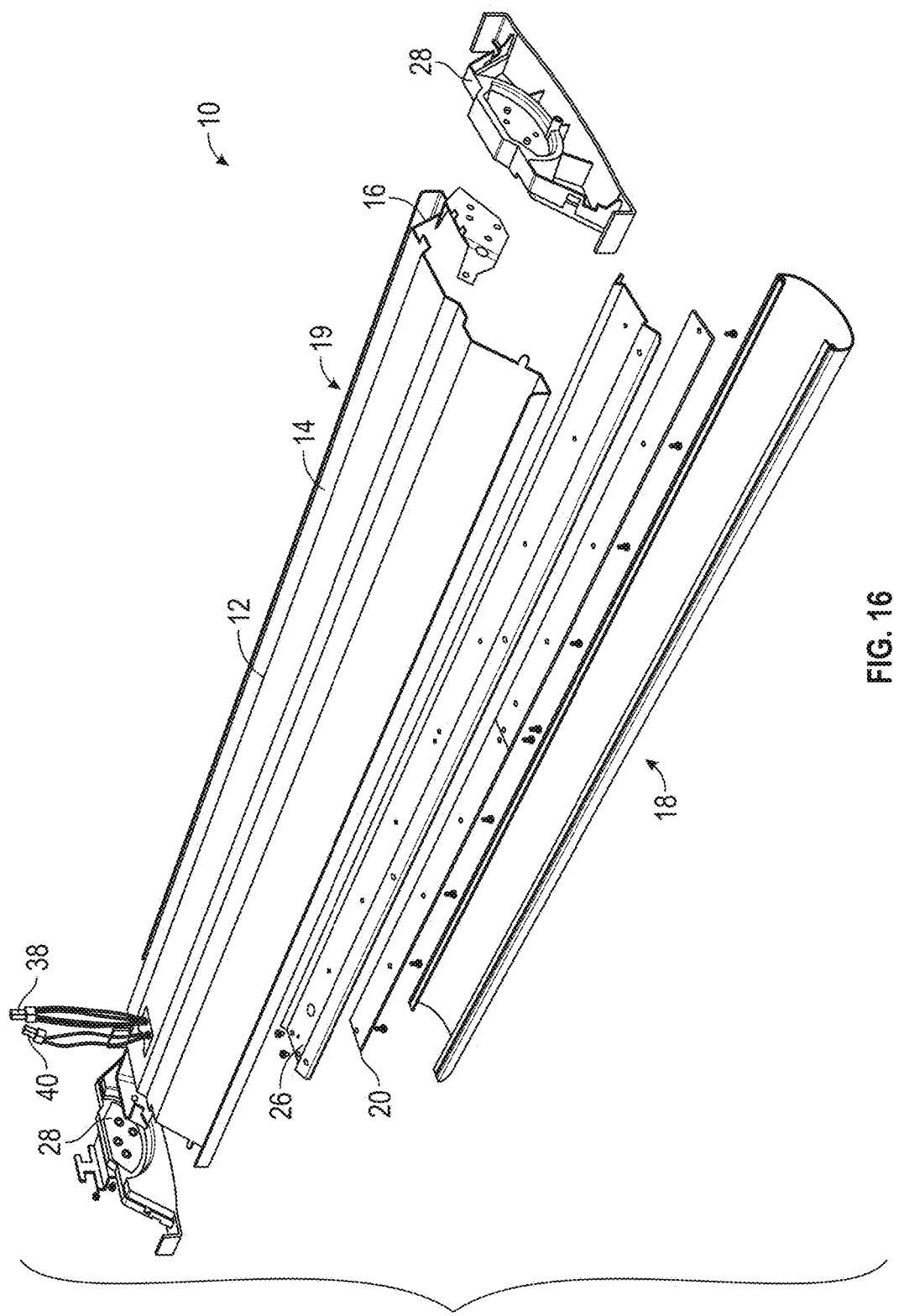
FIG. 16 is an exploded assembly view of the luminaire assembly of FIG. 14.
Figure 17:
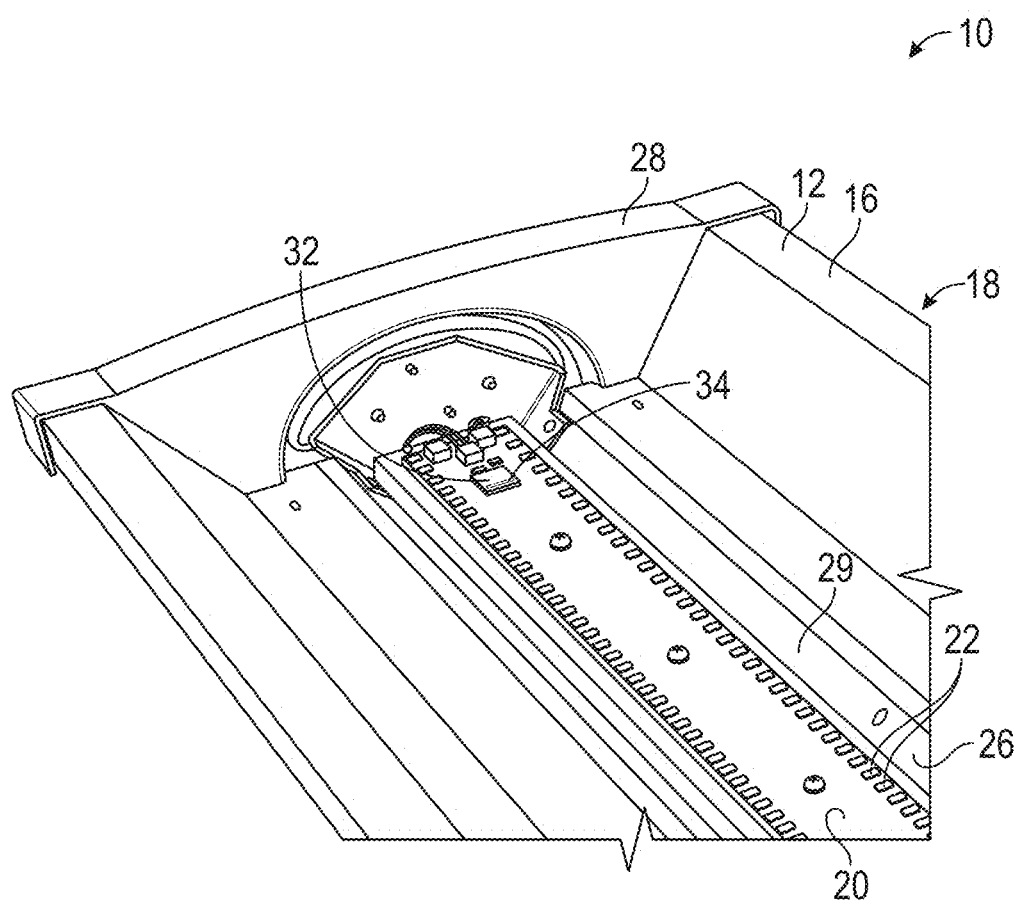
FIG. 17 is an enlarged perspective view of a portion of the luminaire assembly of FIG. 14.

FIGS. 12 and 13 schematically illustrate another such embodiment, whereby BLE antenna 34 is positioned adjacent to the end of the LED luminaire 10. For example, the BLE antenna 34 may be positioned proximate the end of the PCB 20 or channel cover 26 where minimal light illuminates this area of the LED luminaire assembly 10, and thus the BLE antenna 34 may not be visible or may have a reduced visibility. Additionally, because there is minimal light in this area, there is little absorption of light by the BLE antenna 34 and the amount of shadowing caused by the BLE antenna 34 is reduced, which maintains a positive appearance for the viewer. The BLE module 32 may be positioned on the non-light emitting side 19 or alternatively may be provided on the light emitting side 18 (such as proximate the BLE antenna 34). Regardless, it is preferable that the BLE antenna 34 (and BLE module 32 if provided on the light emitting side 18) be mounted so as to have a low profile to avoid the casting of shadows. For example, thin double-sided tape (e.g., on the order of 3 mm or less) may be used to attach the BLE antenna 34.

Figure 33:
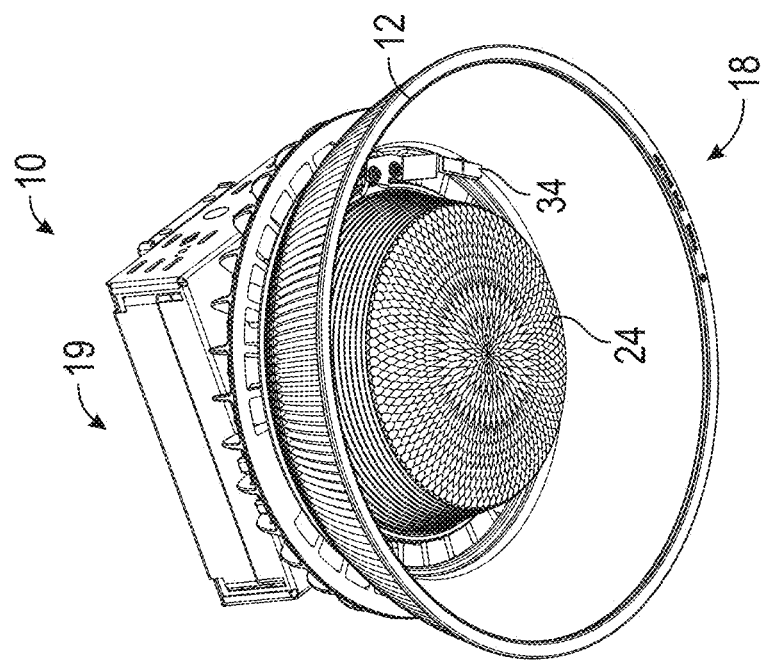
FIG. 33 is a bottom perspective view of the luminaire assembly of FIG. 32.
Figure 32:
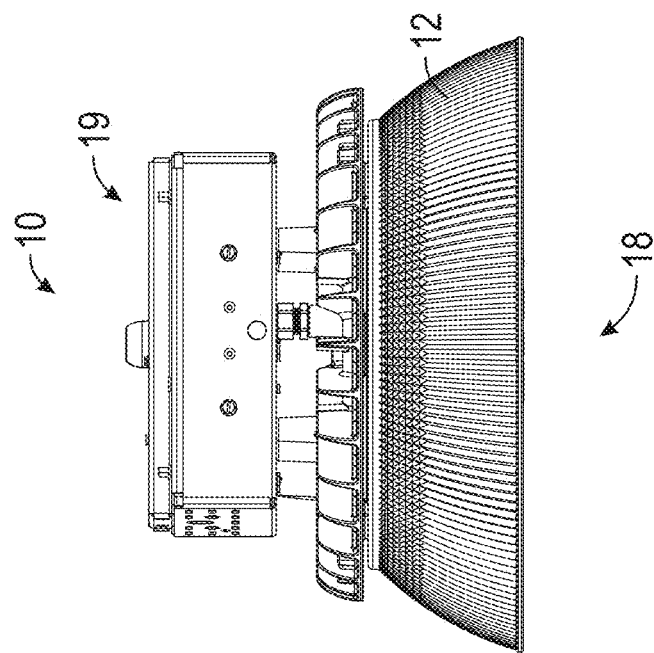
FIG. 32 is a side view of a luminaire assembly according to aspects of the present disclosure.

FIGS. 32 and 33 illustrate another embodiment where the BLE antenna 34 is visually visible from a vantage point below the LED luminaire assembly 10. In some embodiments, the BLE module 32 may also be visually visible from the vantage point below the LED luminaire assembly 10, although it need not be. For example, in other embodiments, the BLE module 32 may be beneath the optic 24 or on the non-light emitting side 19 of the LED luminaire.

BLE Module and BLE Beacon on Same Side of Luminaire Assembly

FIGS. 14-17 illustrate an embodiment where the BLE module 32 and the BLE antenna 34 are provided on the same side of the luminaire assembly 10. In this example, the BLE module 32 and the BLE antenna 34 are both mounted on the light emitting side 18 of the LED luminaire assembly 10. In this illustrated example, the BLE antenna 34 is an onboard antenna on the BLE module 32, which is mounted on the PCB 20. Wiring from the BLE beacon extends upwardly through the light engine to connect (via connector 38) with the driver 36.

Figure 18:
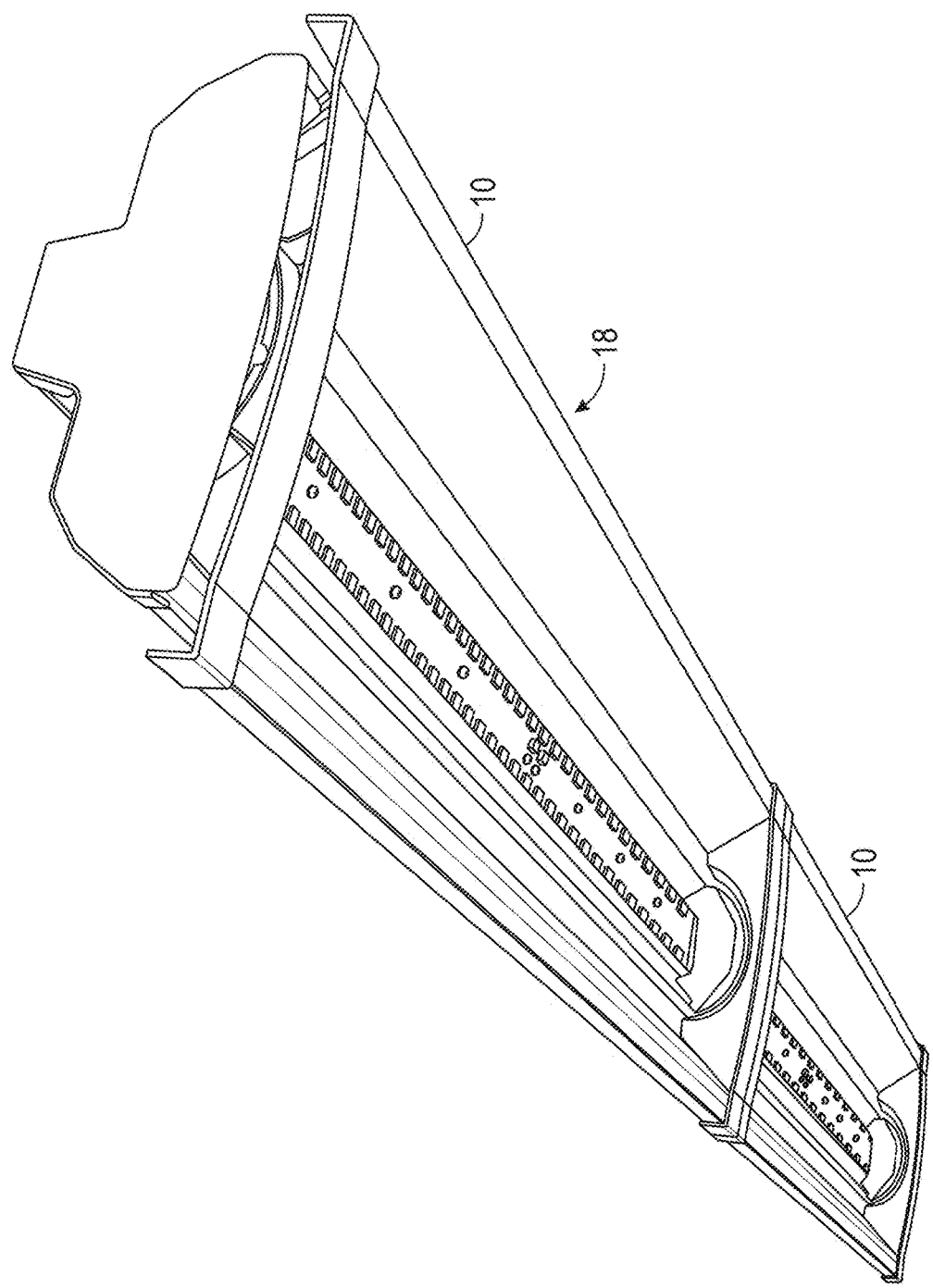
FIG. 18 is a bottom perspective view of a luminaire assembly according to aspects of the present disclosure.

FIG. 18 illustrates two LED luminaire assemblies 10 mounted in tandem. The LED luminaire assemblies 10 may have the BLE beacon as illustrated in FIGS. 1-5, the BLE beacon as illustrated in FIGS. 14-17, or a combination of both types of BLE beacons.

Figure 19:
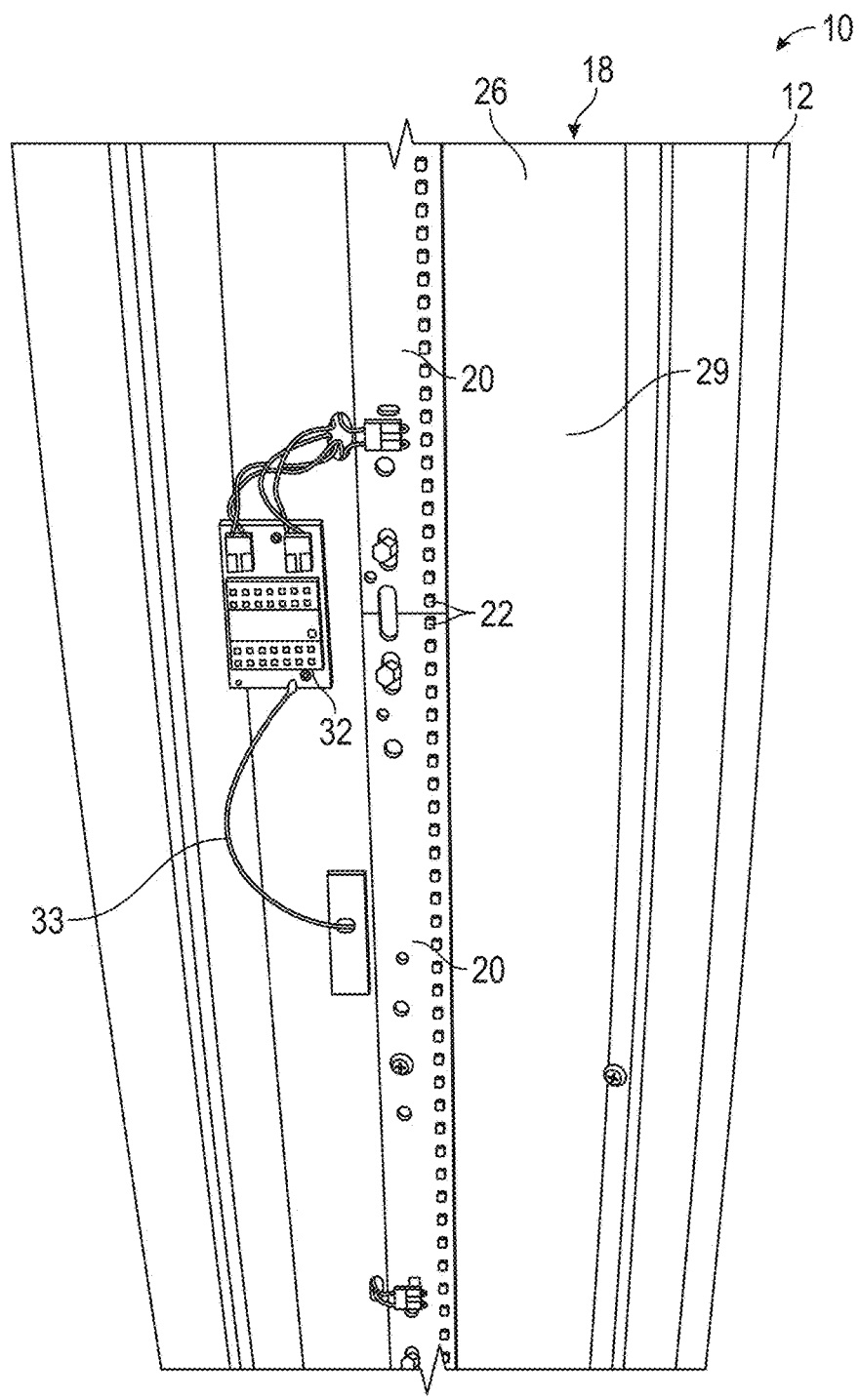
FIG. 19 is a bottom view of a portion of a luminaire assembly according to aspects of the present disclosure.

FIG. 19 illustrates an example of an LED luminaire assembly 10 where the BLE module 32 and the BLE antenna 34 are provided on the same side of the luminaire assembly 10. In this example, a BLE beacon is provided natively or during original manufacture of the new LED luminaire assembly 10. In this example, the BLE module 32 and BLE antenna 34 are both provided on the light emitting side 18 of the LED luminaire assembly 10, although they need not be. In the illustrated embodiment, they are mounted on a lower surface 29 of the channel cover 26, but could be positioned in other locations as well. The BLE module 32 and BLE antenna 34 are shown as separate components connected with a coaxial cable but could be provided as a single component. Wires from the BLE module 32 extend through the LED luminaire assembly 10 and connect with the driver 36.

Figure 20:
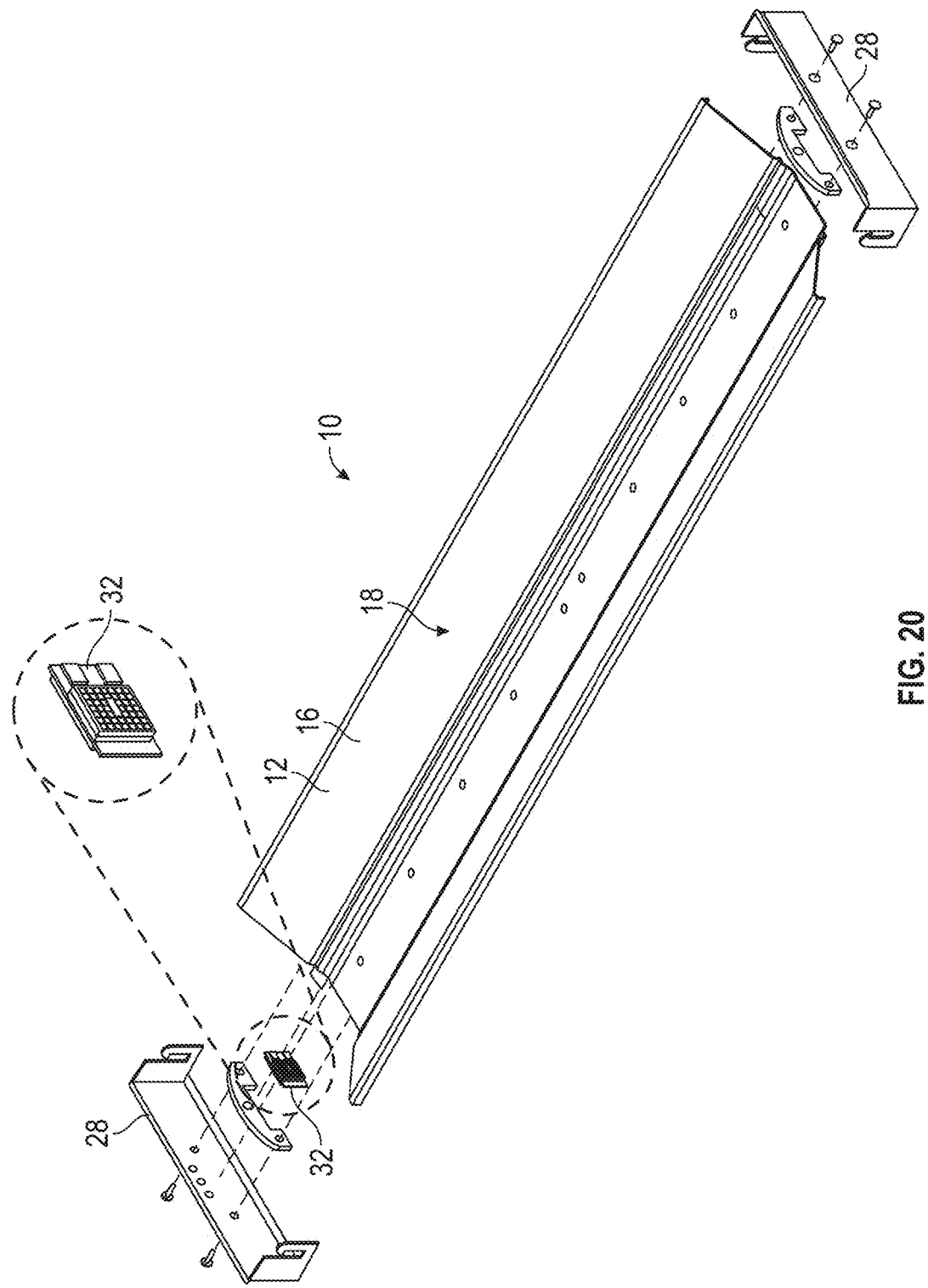
FIG. 20 is an exploded assembly view of a luminaire assembly according to aspects of the present disclosure.
Figure 21:
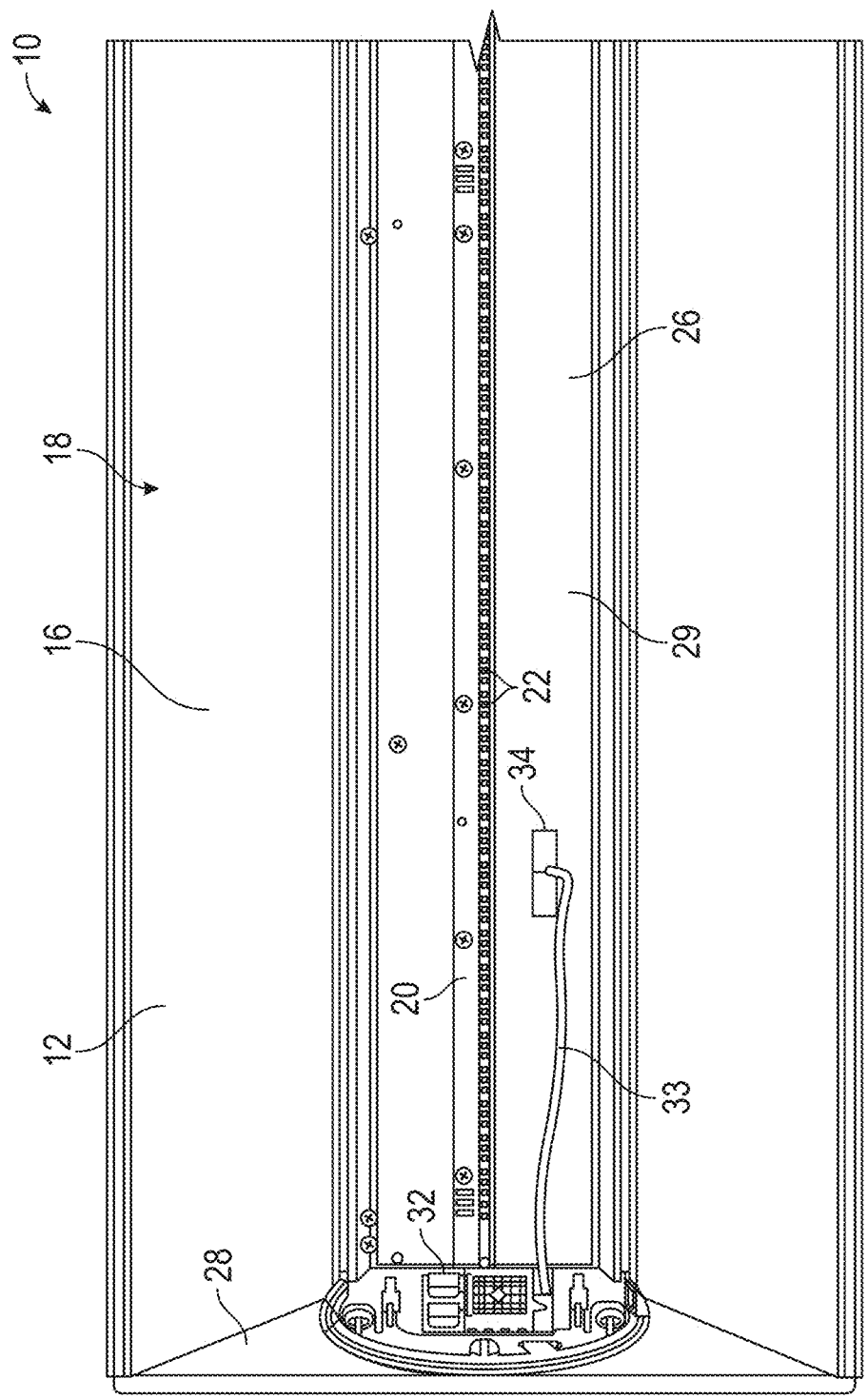
FIG. 21 is an enlarged bottom view of a portion of the luminaire assembly of FIG. 20.

FIGS. 20 and 21 illustrate another example where the BLE module 32 and the BLE antenna 34 are provided on the same side of the luminaire assembly 10. In this example, both the BLE module 32 and BLE antenna 34 are provided on the light emitting side of the LED luminaire assembly 10. In some examples, the BLE module 32 is mounted on an inner surface of the end cap 28, and the BLE antenna 34 is mounted on the lower surface 29 of the channel cover 26 adjacent to the PCB 20 (but it could also be mounted on a reflector 12 or PCB 20). Placement of the BLE module 32 on the end cap 28 may help to hide the BLE module 32 from view when the LED luminaire assembly 10 is illuminated. In some examples, the BLE antenna 34 is connected to the BLE module 32 through wiring, such as a coaxial cable 33. In some cases, the BLE antenna 34 may optionally be mounted through an adhesive tape that has a thickness such that the BLE antenna 34 creates reduced to no shadowing when the LED luminaire assembly 10 is illuminated.

Figure 22:
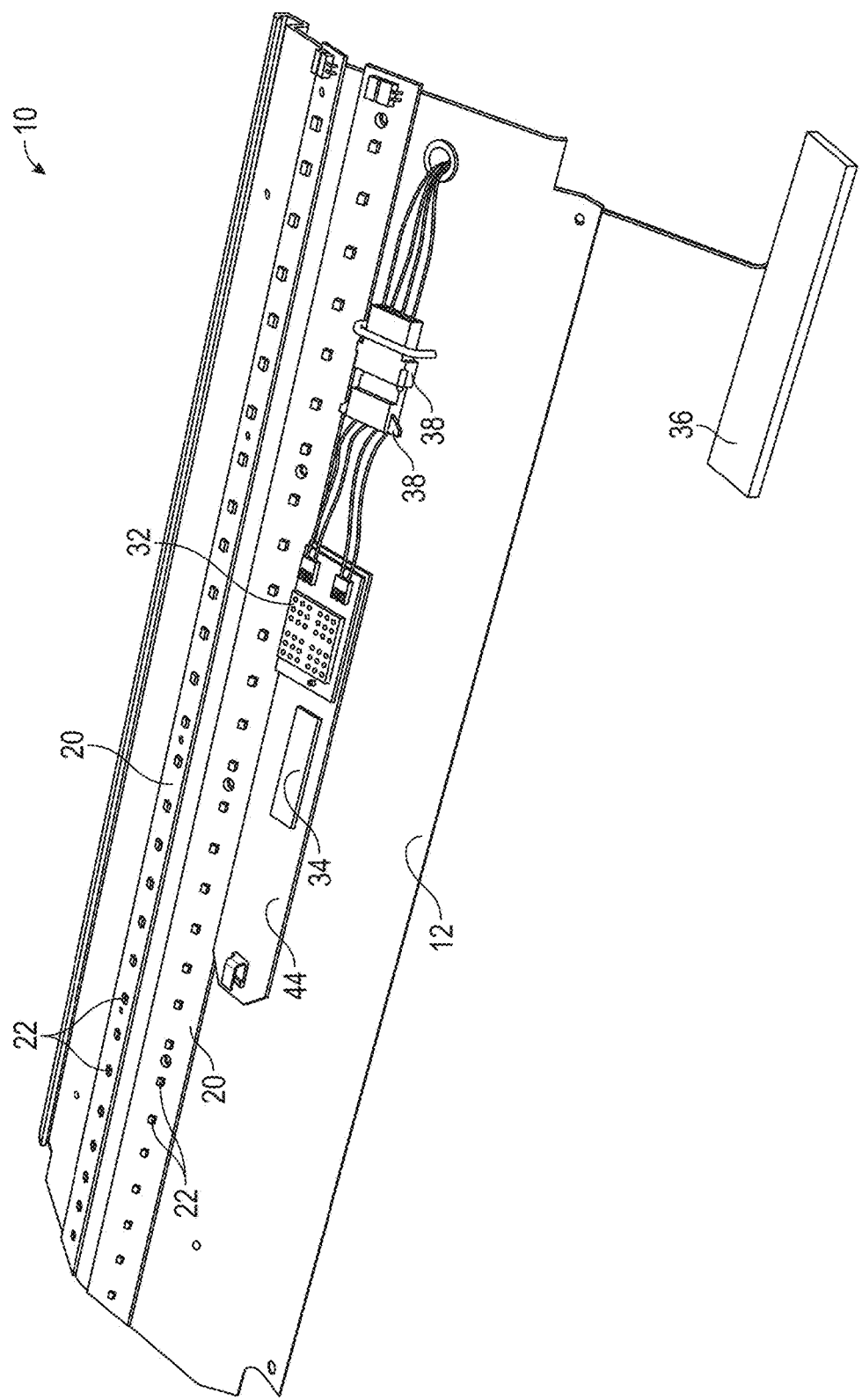
FIG. 22 is a top perspective view of a luminaire assembly according to aspects of the present disclosure.
Figure 23:
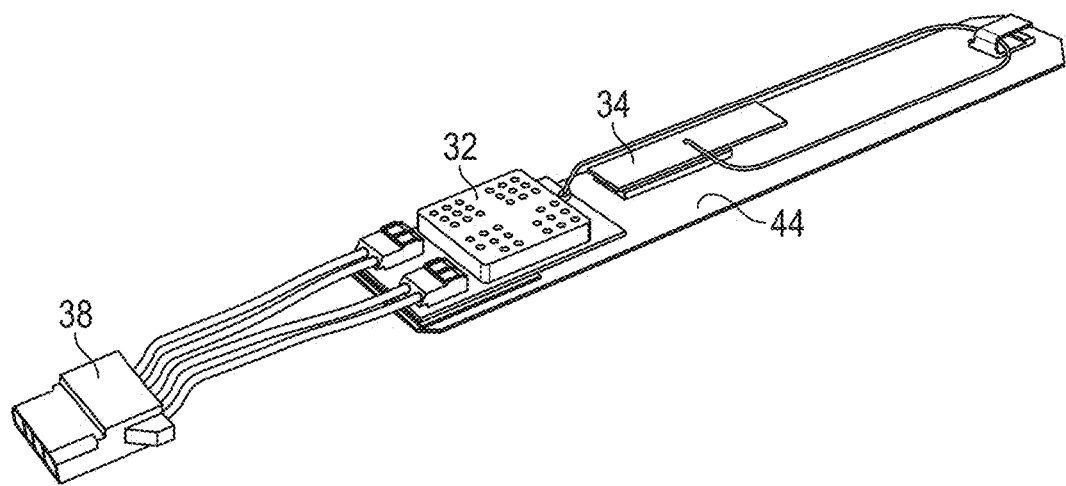
FIG. 23 is a top perspective view of a communication assembly for the luminaire assembly of FIG. 23.
Figure 24:
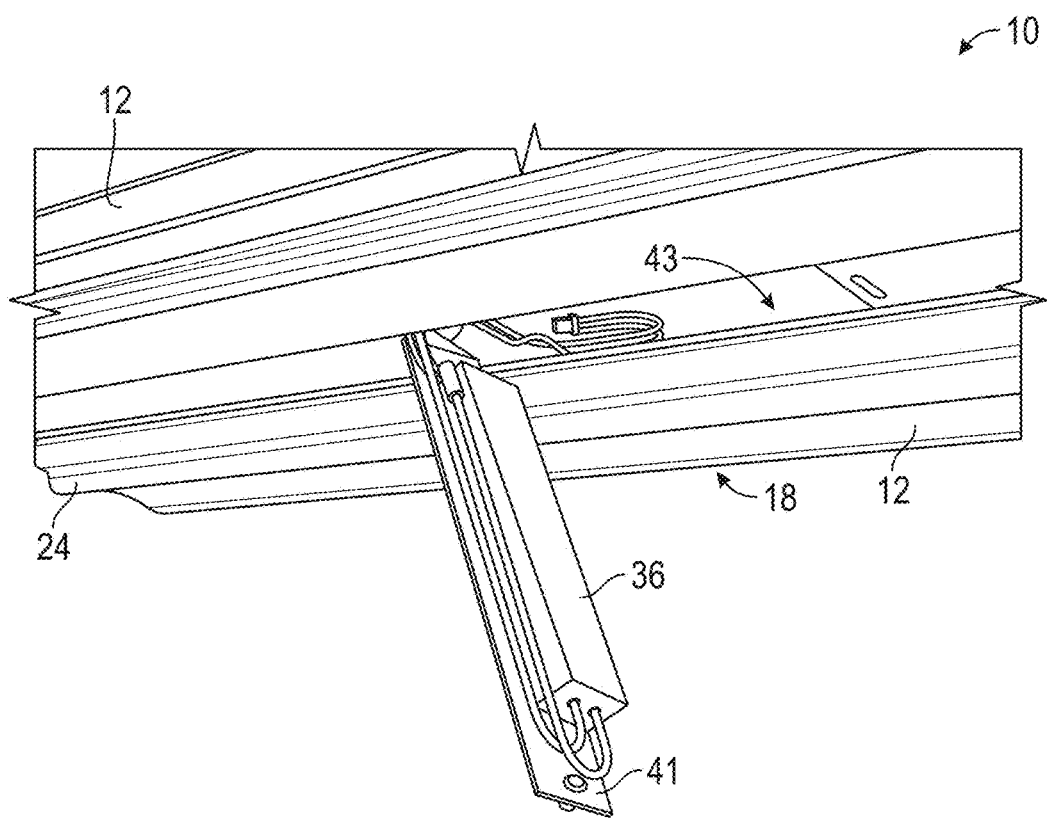
FIG. 24 is an enlarged bottom perspective view of a portion of a luminaire assembly according to aspects of the present disclosure.
Figure 25:
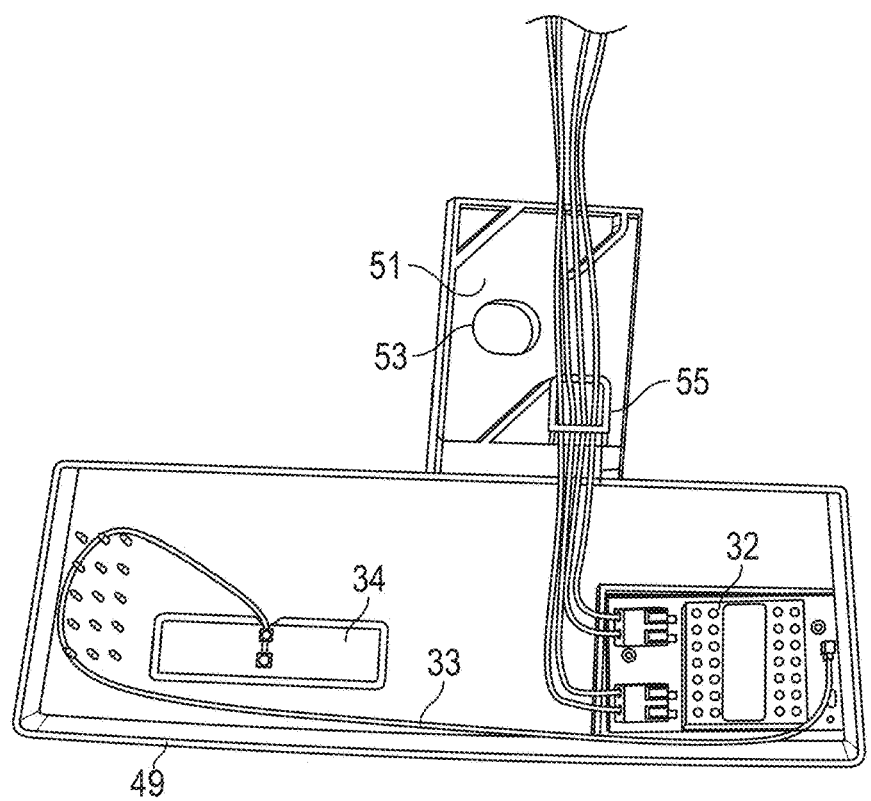
FIG. 25 is a bottom view of a communication assembly for the luminaire assembly of FIG. 24.
Figure 26:
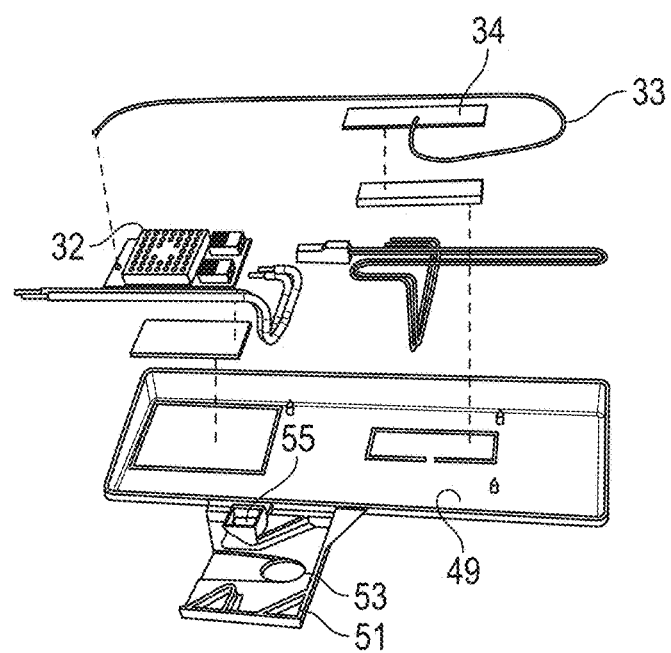
FIG. 26 is an exploded assembly view of the communication assembly of FIG. 25.

FIGS. 22 and 23 illustrate an embodiment similar to that shown in FIG. 19, but the BLE beacon is designed to be retrofitted into an existing luminaire 10. For example, it is possible to hardwire a luminaire to accommodate Bluetooth functionality but not actually equip the luminaire with such functionality. For example, the luminaire in FIG. 22 may be manufactured to include the necessary wiring and connector 38 for Bluetooth capabilities but (unlike the embodiment of FIG. 19) was not equipped during manufacture with Bluetooth capabilities. If a decision is later made to equip the luminaire with Bluetooth capabilities, the retrofit module shown in FIG. 23 could be used.

The retrofit module includes a BLE module 32 with associated BLE antenna 34 (shown as separate parts but that could be integral) provided on a support structure 44. Wires with an associated connector 38 extend from the retrofit module. To install the retrofit module, the support structure 44 is mounted on the existing luminaire at the desired location (such as via mechanical or chemical retention methods) and the wires from the retrofit module are snap-fitted via connectors 38 with the existing power wires on the luminaire.

In all of the embodiments disclosed so far where the BLE module 32 and BLE antenna 34 are on the same side or opposing sides of the LED luminaire 10, the BLE beacon is positioned on the LED luminaire assembly 10 such that, when the optic 24 is mounted on the LED luminaire assembly 10, the BLE antenna 34 is not visible from below but is able to emit RF signals of sufficient strength to devices below. The BLE antenna 34 is preferably positioned relative to other electrical components in the LED luminaire assembly 10 such that the BLE antenna 34 can emit its signals with minimal interference.

FIGS. 24-31 illustrate another embodiment of a Bluetooth retrofit module to impart Bluetooth capability into an existing luminaire. In this embodiment, the luminaire 10 includes a driver 36 provided on a driver door 41 (see FIG. 24) that is pivotally connected to the reflector 12 such that a person may access the driver 36 without having to remove the LED luminaire assembly 10. In these examples, the reflector 12 defines a corresponding driver door opening 43 to accommodate the driver door 41 and driver 36 when the driver door 41 is in a closed position. It will be understood that the Bluetooth retrofit module can be used on any luminaire having a driver door 41. In some examples, the LED luminaire assembly 10 includes a divider/louver assembly 45 that is hinged and includes a longitudinal divider 47. (See FIGS. 29-31). A driver door 41 is hinged and is located under the longitudinal divider 47 and is accessible when the divider/louver assembly 45 is open.

Figure 27:
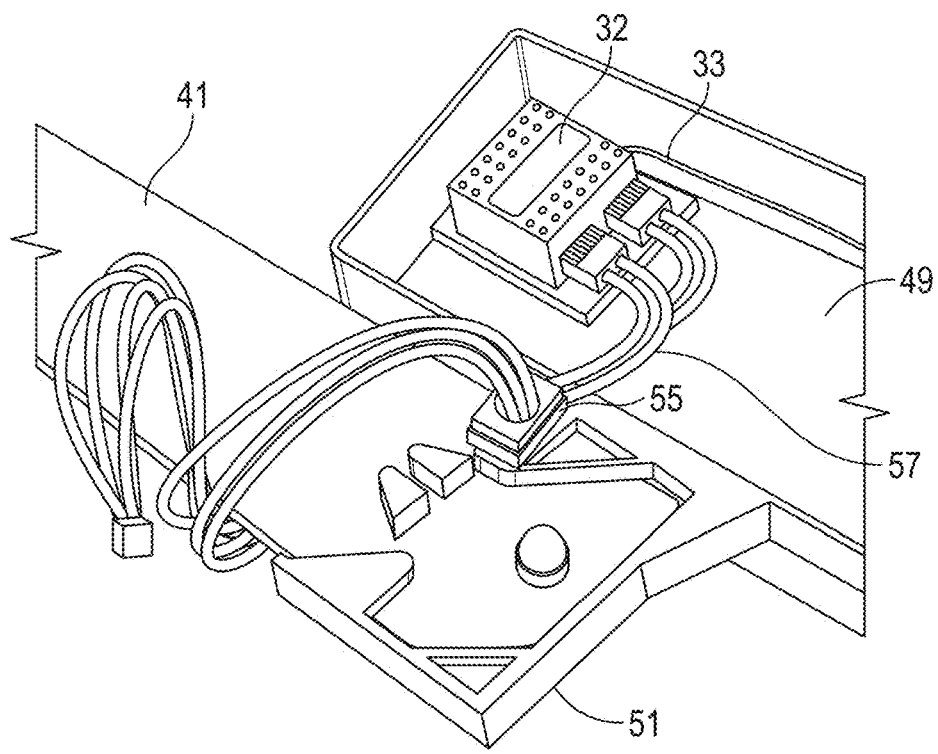
FIG. 27 is an enlarged top perspective view of the communication assembly of FIG. 25 mounted on a door of the luminaire assembly of FIG. 24.
Figure 28:
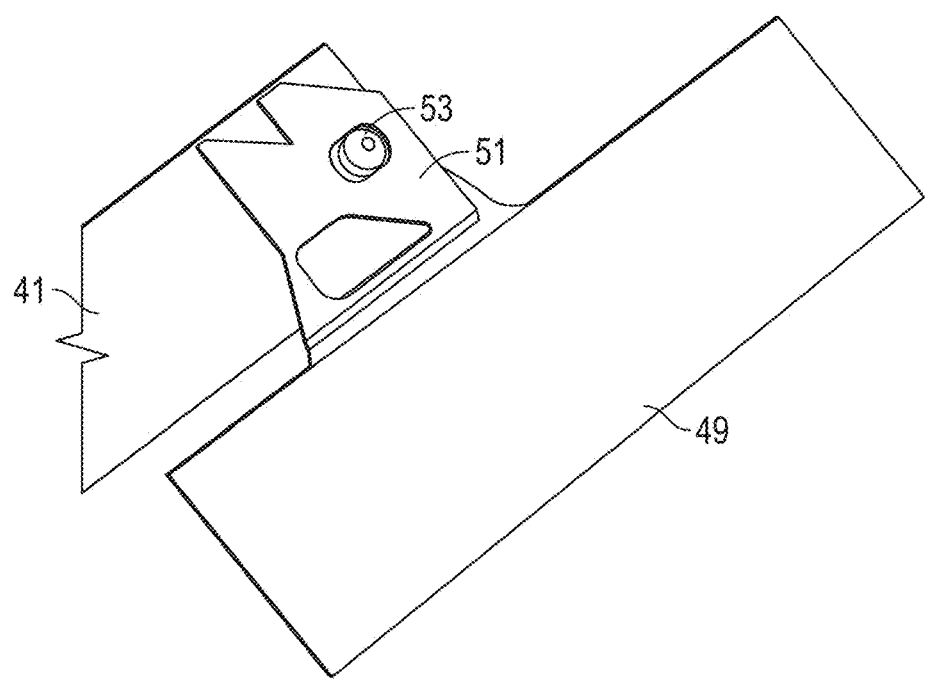
FIG. 28 is an enlarged bottom perspective view of the communication assembly of FIG. 25 mounted on the door of the luminaire assembly of FIG. 24.
Figure 29:
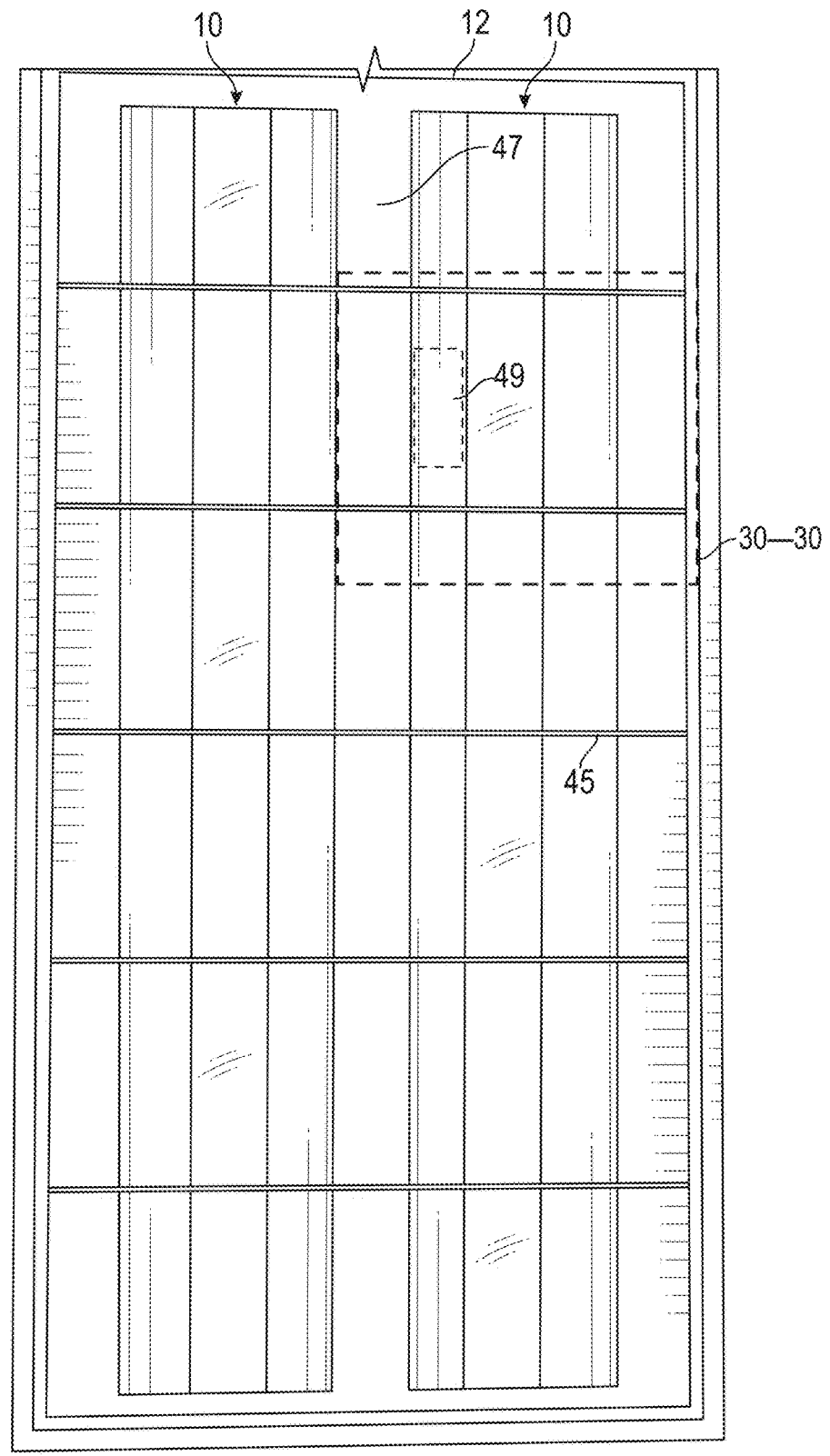
FIG. 29 is a bottom view of the luminaire assembly of FIG. 24.
Figure 30:
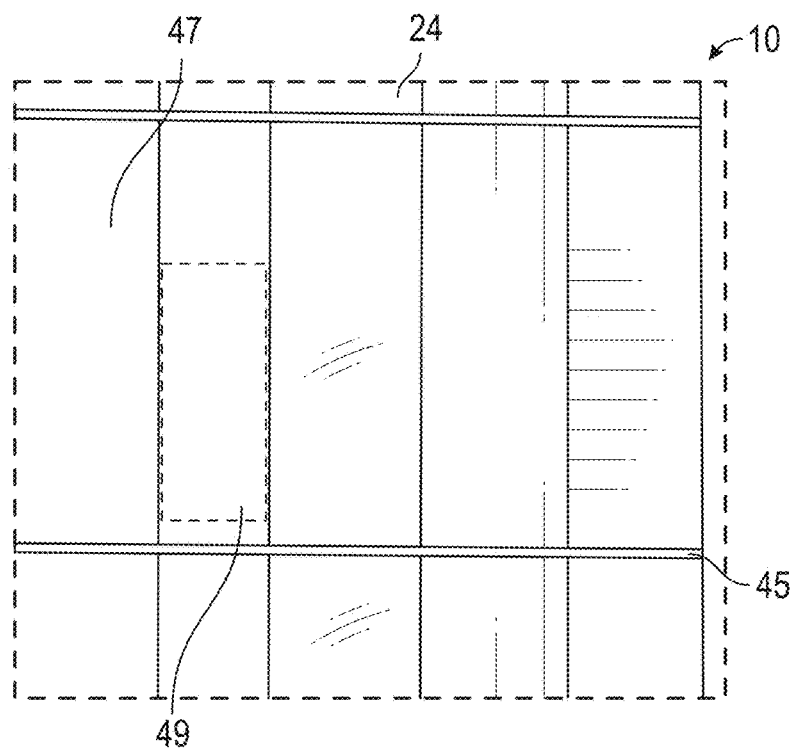
FIG. 30 is an enlarged bottom view of a portion of the luminaire assembly of FIG. 24 in box 30-30 in FIG. 29.
Figure 31:
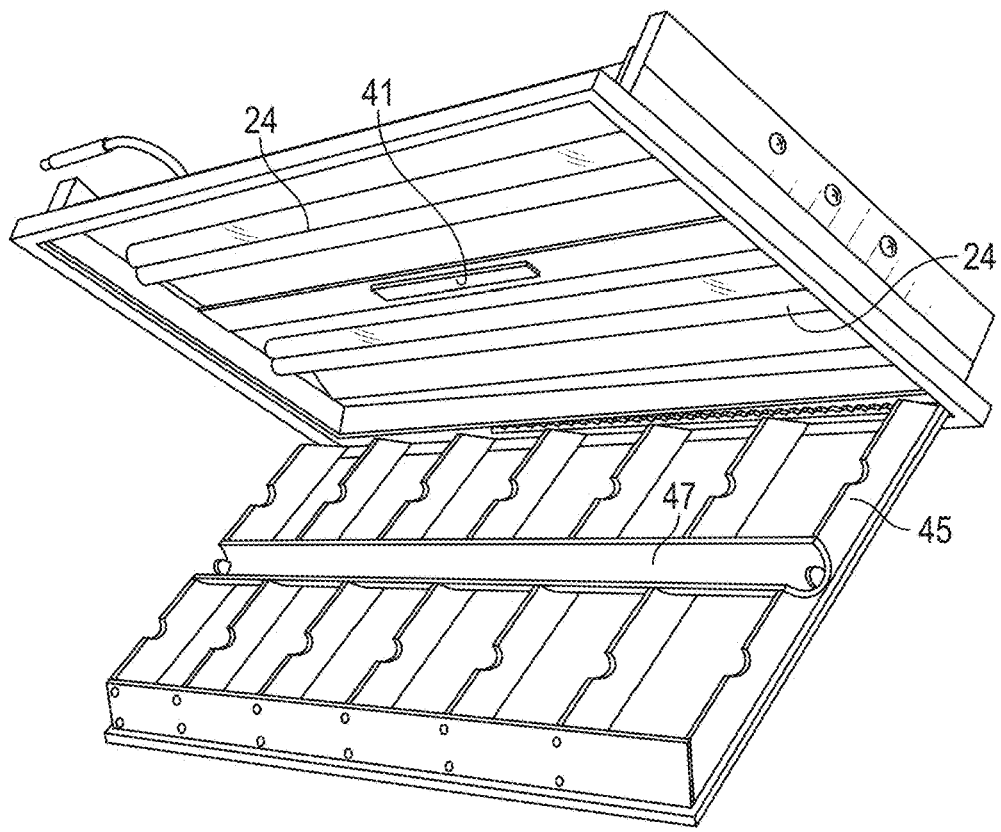
FIG. 31 is a bottom perspective view of a luminaire assembly according to aspects of the present disclosure.

The Bluetooth retrofit module (best seen in FIGS. 27-29) includes a housing 49 that houses the BLE module 32, BLE antenna 34, and associated wiring. The housing 49 is preferably made of a material (such as plastic) that permits the BLE antenna 34 to emit signals from the housing 49. The housing 49 is designed to mount onto the driver door 41, preferably but not necessarily without the use of fasteners, as shown in FIGS. 27 and 28. In some embodiments, the housing 49 includes a pocket 51 that slides onto the end of the driver door 41. The housing 49 may also include a slotted hole for capturing an existing fastener that is installed on the driver door 41 and used to secure the driver door 41 in a closed positon. A wire guide 55 can also be formed in the housing 49 to route the Bluetooth wiring 57 from the housing 49 for connection to the driver 36. The wire guide 55 ensures that the wires 57 are routed away from the sharp metal edges of the driver door 41.

In the illustrated embodiment, and when the BLE retrofit module is installed on the driver door 41, the housing 49 is offset from the axis of the driver door 41 in the LED luminaire assembly 10. This is so that, when the driver door 41 is closed and the divider/louver assembly 45 is closed, the housing 49 will not be positioned behind the longitudinal divider 47, which would detrimentally impact the ability of the BLE antenna 34 to transmit its signal in cases where the longitudinal divider 47 is metal. However, in luminaires with other configurations, it might be desirable for the housing 49 to extend coaxially with the driver door 41.

In various other examples where a luminaire 10 includes the longitudinal divider 47, the BLE module 32 and/or the BLE antenna 34 may be positioned on the longitudinal divider 47. Similarly, in examples where the luminaire 10 includes the divider/louver assembly 45, the BLE module 32 and/or the BLE antenna 34 may be positioned on the divider/louver assembly 45.

Different arrangements of the components depicted in the drawings or described above, as well as components and steps not shown or described are possible. Similarly, some features and sub-combinations are useful and may be employed without reference to other features and sub-combinations. Examples of the invention have been described for illustrative and not restrictive purposes, and alternative examples will become apparent to readers of this patent. Accordingly, the present invention is not limited to the examples described above or depicted in the drawings, and various examples and modifications may be made without departing from the scope of the claims below.

That which is claimed:

1. A retrofit kit for an existing luminaire assembly comprising:
   a beacon support configured to connect to the existing luminaire assembly; and
   a wireless beacon on the beacon support, wherein the wireless beacon comprises:
      a module; and
      an antenna associated with the module,
      wherein the antenna is communicatively visible from a light emitting side of the existing luminaire assembly when the retrofit kit is installed, and
      wherein the wireless beacon is configured to provide a signal extending a predetermined distance from the existing luminaire assembly when the retrofit kit is installed such that a wireless receiver on a user device can receive the signal from the wireless beacon.

2. The retrofit kit of claim 1, wherein the beacon support comprises a bracket that is configured to mount on a reflector of the existing luminaire assembly such that the bracket in on a non-light emitting side of the existing luminaire assembly when installed, and wherein the wireless beacon is on the bracket such that the module and antenna are on the light-emitting side of the existing luminaire assembly when installed.

3. The retrofit kit of claim 1, wherein the beacon support comprises a housing and a pocket, wherein the pocket is configured to receive at least a portion of a driver door of the existing luminaire assembly to mount the beacon support on the existing luminaire assembly when installed, and wherein the module and antenna of the wireless beacon are positioned within the housing.

4. The retrofit kit of claim 1, wherein the beacon support comprises a bracket that is configured to mount on reflector of the existing luminaire assembly such that the bracket in on a non-light emitting side of the existing luminaire assembly when installed, and wherein the wireless beacon is on the bracket such that the module is on the non-light emitting side of the existing luminaire assembly and the antenna is on the light emitting side of the existing luminaire assembly when installed.

5. The retrofit kit of claim 1, wherein the wireless beacon is a Bluetooth beacon, wherein the module is a Bluetooth module, and wherein the signal is a Bluetooth signal.

6. A luminaire assembly comprising a wireless beacon on the luminaire assembly, wherein the wireless beacon comprises:
   a module; and
   an antenna associated with the module,
   wherein the luminaire assembly comprises a light-emitting side and a non-light emitting side,
   wherein the antenna is communicatively visible from the light-emitting side of the luminaire assembly, and
   wherein the wireless beacon is configured to provide a signal extending a predetermined distance from the luminaire assembly such that a wireless receiver on a user device can receive the signal from the wireless beacon.

7. The luminaire assembly of claim 6, wherein the wireless beacon is a Bluetooth beacon, wherein the module is a Bluetooth module, and wherein the signal is a Bluetooth signal.

8. The luminaire assembly of claim 6, wherein the module and antenna are positioned on opposing sides of the luminaire assembly.

9. The luminaire assembly of claim 6, wherein the module and antenna are both positioned on the light-emitting side or the non-light emitting side of the luminaire assembly.

* * * * *